(12) United States Patent
Chakrabarty et al.

(10) Patent No.: US 11,467,544 B1
(45) Date of Patent: Oct. 11, 2022

(54) EXTREMUM SEEKING CONTROL WITH STOCHASTIC GRADIENT ESTIMATION

(71) Applicant: Mitsubishi Electric Research Labroatories, Inc., Cambridge, MA (US)

(72) Inventors: Ankush Chakrabarty, Bedford, MA (US); Claus Danielson, Somerville, MA (US); Scott Bortoff, Brookline, MA (US); Christopher Laughman, Waltham, MA (US)

(73) Assignee: Mitsubishi Electric Research Labroatories, Inc., Cambridge, MA (US)

( * ) Notice: Subject to any disclaimer, the term of this patent is extended or adjusted under 35 U.S.C. 154(b) by 12 days.

(21) Appl. No.: 17/214,812

(22) Filed: Mar. 27, 2021

(51) Int. Cl.
*G05B 13/02* (2006.01)
*G05B 6/02* (2006.01)
*G06F 17/18* (2006.01)

(52) U.S. Cl.
CPC ............. *G05B 13/024* (2013.01); *G05B 6/02* (2013.01); *G06F 17/18* (2013.01)

(58) Field of Classification Search
CPC .......... G05B 13/024; G05B 6/02; G06F 17/18

USPC ........................................................ 700/275
See application file for complete search history.

(56) References Cited

U.S. PATENT DOCUMENTS

2019/0293308 A1\* 9/2019 Salsbury ............... F24F 5/0035
2021/0181703 A1\* 6/2021 Perez ................... G05B 19/054

\* cited by examiner

*Primary Examiner* — Jigneshkumar C Patel
(74) *Attorney, Agent, or Firm* — Gennadiy Vinokur; Hironori Tsukamoto

(57) ABSTRACT

A control system for controlling a set of actuators of a system. The control system comprising a switcher configured to select a subset of setpoints from a set of setpoints that control the corresponding set of actuators. An extremum-seeking controller (ESC) configured to perturb a subset of setpoints at each iteration based on a probabilistic distribution of partial gradients of a cost function relating values of the subset of setpoints to a cost of operation of the system. A stochastic gradient estimator is configured to estimate a full gradient of the cost function and update the estimation of the full gradient based on the probabilistic distribution of the partial gradients generated at each ESC iteration. A feedback controller is configured to drive a state of the subset of actuators of the system towards the corresponding perturbed subset of setpoints.

18 Claims, 12 Drawing Sheets

EXTREMUM SEEKING CONTROL WITH STOCHASTIC GRADIENT ESTIMATION

TECHNICAL FIELD

The present disclosure relates generally to control systems and more particularly to an extremum-seeking control system and a method for controlling a system.

BACKGROUND

Extremum-seeking controllers (ESCs) are used for real-time optimization of dynamic systems in a model-free manner Extremum-seeking control is a form of model-free adaptive control for the real-time optimization of a dynamic systems. The ESC uses a frequency domain approach in which a sinusoidal excitation signal and an averaging filter are used to estimate a gradient of a cost function, which is integrated until an optimal point is reached. The cost function represents a performance metric of the operation of a system under control. An example of the performance metric is a power consumption of the controlled system.

The gradient estimation of the cost function is straightforward when the analytical form of such a cost function is available. However, in most of the data-driven ESC methods, the cost function is unknown. Hence, one of the main challenges of the ESC is that the gradient of the unknown cost function must be estimated from data gathered while the system is in operation.

A typical setting for controlling a system using the ESC includes two types of controllers. The first controller is a setpoint optimizer configured to produce values of setpoints for actuators of the controlled systems. The second controller is a feedback controller designed to drive the state of the controlled system toward the setpoints determined by the setpoint optimizer. Examples of the feedback controller include a proportional integral (PI) controller, a proportional—integral—derivative controller (PID) controller, and a model predictive control (MPC) controller. In the context of extremum seeking, the ESC forms the setpoint optimizer to use a periodic excitation of the setpoint values for their optimization.

When the analytical form of the cost function is unavailable, the ESC and the feedback controller work together to estimate the gradient of the unknown cost function from the operational data that includes the increments in the cost function caused by the increments of the setpoints. Such a calculation is performed recursively in real-time during the control of the system. However, in a number of practical applications, the number of setpoints for different actuators of the controlled system considered by the ESC in each control step is sufficiently large to be computationally burdensome for the real-time estimation.

Accordingly, there is a need to increase the computational efficiency of data-driven ESC with the unknown cost function of the performance of a system under the control.

SUMMARY

It is an object of some embodiments to provide a system and a method for data-driven control of systems with multiple actuators. It is another object of some embodiments to provide an extremum seeking controller (ESC) that can estimate setpoints for multiple actuators of a controlled system to optimize its performance. Hereinafter, terms "controlled system", "system to be controlled", and "system" are used interchangeably. As used herein, "setpoint" refers to the desired value of a variable of the system. The term "setpoint" is applied to any particular value of a specific set of control signals, and thermodynamic and operational parameters. For example, if the controlled system is the HVAC system, the setpoints may include one or more of a speed of an indoor fan, a speed of an outdoor fan, a position of an expansion valve, the speed of the compressor, and the like. It is another object of some embodiments to provide the ESC that estimates a gradient of the unknown cost function in a data-driven but computationally efficient manner Hence, the setpoints of the system is a vector, also referred to herein a setpoint vector, that in each control step includes different setpoint values for different actuators of the system under control.

Some embodiments are based on the recognition that the ESC aims to produce an optimal combination of setpoints to optimize the performance of a controlled system. Hence, rather than optimizing the performance of a specific actuator of the system, the ESC optimizes the performance of multiple actuators collectively. Hence, the ESC needs to estimate the full gradient of the cost function for all setpoints of multiple actuators. While the analytical form of the cost function is unknown, the cost function relates the values of all setpoints to the cost of operation. To that end, the ESC perturbs or excites all values of the setpoint vector to perform the optimization.

Such excitation of all setpoint values in the setpoint vector is advantageous because it allows reaching the optimal performance of the controlled system. However, some embodiments are based on the realization that in various situations, such excitation is suboptimal, computationally expensive, and sometimes even impossible.

For example, in some situations, some setpoints of the controlled system are either fixed, for example by a user, or operate at the constraint level preventing sinusoidal perturbation violating the constraints. In these situations, the excitation of the setpoints for these actuators is impossible or at least impractical. In another situation, there are too many setpoint values that need to be considered at each control step, making the excitation and subsequent computation of all setpoint values computationally burdensome. However, for each control step, the full estimation of the gradient of all setpoints is necessary according to the principles of the ESC.

Some embodiments are based on the realization that a full gradient of a cost function of the entire setpoint vector can be determined stochastically based on partial gradients of the cost function for different subsets of elements of the setpoint vector. Specifically, a partial gradient for a subset of setpoints represents an incremental change of the cost function with respect to actuating a subset of actuators corresponding to the subset of setpoints. The partial gradient is insufficient to govern the entire operation of the ESC but can be sufficient to contribute to the estimation of the full gradient because the full gradient, at least statistically, should be consistent with all different partial gradients.

Further, it is also an object of the present disclosure is to design a control system model that may be used in any system (e.g. a Heating, ventilation, and air conditioning system (an HVAC system), audio systems, vehicles, and the like) to minimize energy consumed by the system. Some embodiments are based on the realization that energy efficiency may be achieved by optimizing different control inputs of the system. Additionally or alternatively, it is also an object of the present disclosure to achieve self-optimization by the control system such that minimum energy consumption is achieved.

To that end, some embodiments are based on a realization that extremum seeking control, which is a class of self-optimizing control strategies, can dynamically search for the unknown and/or time-varying inputs of a system to be controlled for optimizing a certain performance index. The extremum seeking control can be considered as a dynamic realization of gradient searching through the use of dithering signals. The gradient of the system output with respect to the system input is typically obtained by slightly perturbing system operation and applying a demodulation measure. Optimization of system performance can be obtained by driving the gradient towards zero by using an integrator in the closed-loop system.

In some embodiments, an optimal set point may be provided by a user in real time at which the system is desired to be operated with minimum energy consumption. For example, the system comprises a set of air conditioners (ACs) controlling a temperature of a conference room. Suppose, the user desires to keep the temperature of the conference room equal to 20 degree Celsius and desires to operate the system with minimum energy consumption. The user may provide the desired temperature (20 degree Celsius) as input to the system. The desired setpoint provided by the user is referred to as an optimal setpoint at which the system is to be operated. Based on the optimal setpoint, the control system controls a set of actuators of the system such that the temperature of the conference room is adjusted to the optimal setpoint with minimum energy consumed by the system. The set of actuators correspond to the set of ACs, where by controlling each actuator of the set of actuators corresponding AC of the set of ACs can be manipulated.

Some embodiments are based on the realization that, when at least one actuator of the multiple actuators of the system is non-controllable, it is difficult to manipulate the remaining actuators to optimize energy consumption of the system at the specified set point. In some embodiments, the at least one actuator of the multiple actuators may be non-controllable when a control input to the actuator is specified by the user during real-time operation.

For example, if the user has specified that the fan speed of the AC should be 10 rpm, then determining optimal control input values to control actuators of the AC such that 22 degree Celsius temperature is provided for fixed value of fan speed (10 rpm) which is one of the control inputs and achieving the minimum energy consumption at the specified set point is a challenging problem. In another embodiment, the at least one actuator is uncontrollable when connection to the actuator is lost due to any unforeseen reasons which may further result in large energy consumption. Accordingly, achieving minimum energy consumption becomes a difficult task.

To that end, some embodiments are based on a realization that the extremum seeking control with stochastic gradient descent algorithm provides real-time optimization solutions in accordance with dynamic nature of the inputs that vary randomly. Stochastic gradient descent (SGD) algorithms are a family of well-studied iterative gradient-based optimisation algorithms that find applications in a broad range of areas such as adaptive control and neural networks. In contrast to the standard optimisation algorithms such as the steepest descent or Newton methods which exploit direct gradient information, SGD algorithm operates based on approximation to the gradient constructed from noisy measurements of the objective/cost function. For the former, knowledge of the underlying system input—output relationships are often needed to calculate the gradient using for example, the chain rule. This is not necessary for SGD algorithm, making it well-suited for non-model based extremum seeking control.

In some embodiments, the actuators are monitored during real-time operation of the controlled system. By monitoring the actuators, status of each actuator can be determined at each instance of operation being executed on the controlled system. The status of the actuators may correspond to non-functional state of one or more actuators, sudden change in inputs at the one or more actuators, and the like. Information regarding such random events during the real-time operation of the controlled system is very crucial to optimize the energy consumption.

Accordingly, when the control system observes any change at the actuators, the control system may execute the extremum seeking controller with SGD algorithm to determine a combination of the actuators which provide optimized energy consumption along with execution of intended operation (for example, providing air conditioning as required by the user). Hence, the control system becomes self-sufficient and can automatically tackle the situations where a random event occurs at the one or more actuator, without requiring any external intervention to the control system.

Accordingly, an embodiment discloses a control system for controlling a set of actuators of a system, the control system comprising at least one processor; and memory having instructions stored thereon that form modules of the control system, wherein the at least one processor is configured to execute the instructions of the modules of the control system. The modules comprise a switcher configured to: create a plurality of subsets of setpoints from a set of setpoints, wherein the set of setpoints controls the corresponding set of actuators; and select a subset of setpoints from the plurality of subsets of set point, wherein the subset of setpoints controls the corresponding subset of actuators. The modules further comprise an extremum-seeking controller (ESC) configured to perturb one or more setpoints of the selected subset of setpoints at each iteration based on a first-order moment and a second-order moment of a probabilistic distribution of partial gradients, generated from a current ESC iteration and the previous ESC iterations, of a cost function relating values of the subset of setpoints to a cost of operation of the system. The modules further comprises as a stochastic gradient estimator configured to: estimate a full gradient of the cost function with respect to an incremental change in each subset of setpoints; and update estimation of the full gradient based on the probabilistic distribution of the partial gradients generated at each ESC iteration; and a feedback controller configured to drive a state of the subset of actuators of the system towards the corresponding perturbed subset of setpoints.

Accordingly, an embodiment discloses a method of controlling a set of actuators of a system, the method comprising: creating a plurality of subsets of setpoints from a set of setpoints, wherein the set of setpoints controls the corresponding set of actuators; selecting a subset of setpoints from the plurality of subsets of set point, wherein the subset of setpoints controls the corresponding subset of actuators; perturbing one or more setpoints of the selected subset of setpoints at each iteration based on a first-order moment and a second-order moment of a probabilistic distribution of partial gradients, generated from a current ESC iteration and the previous ESC iterations, of a cost function relating values of the subset of setpoints to a cost of operation of the system; estimating a full gradient of the cost function with respect to an incremental changes in each subset of setpoints; updating estimation of the full gradient based on the probabilistic distribution of the partial gradients generated at each ESC iteration; and driving a state of the subset of actuators of the system towards the corresponding perturbed subset of setpoints.

DETAILED DESCRIPTION

Figure 1:
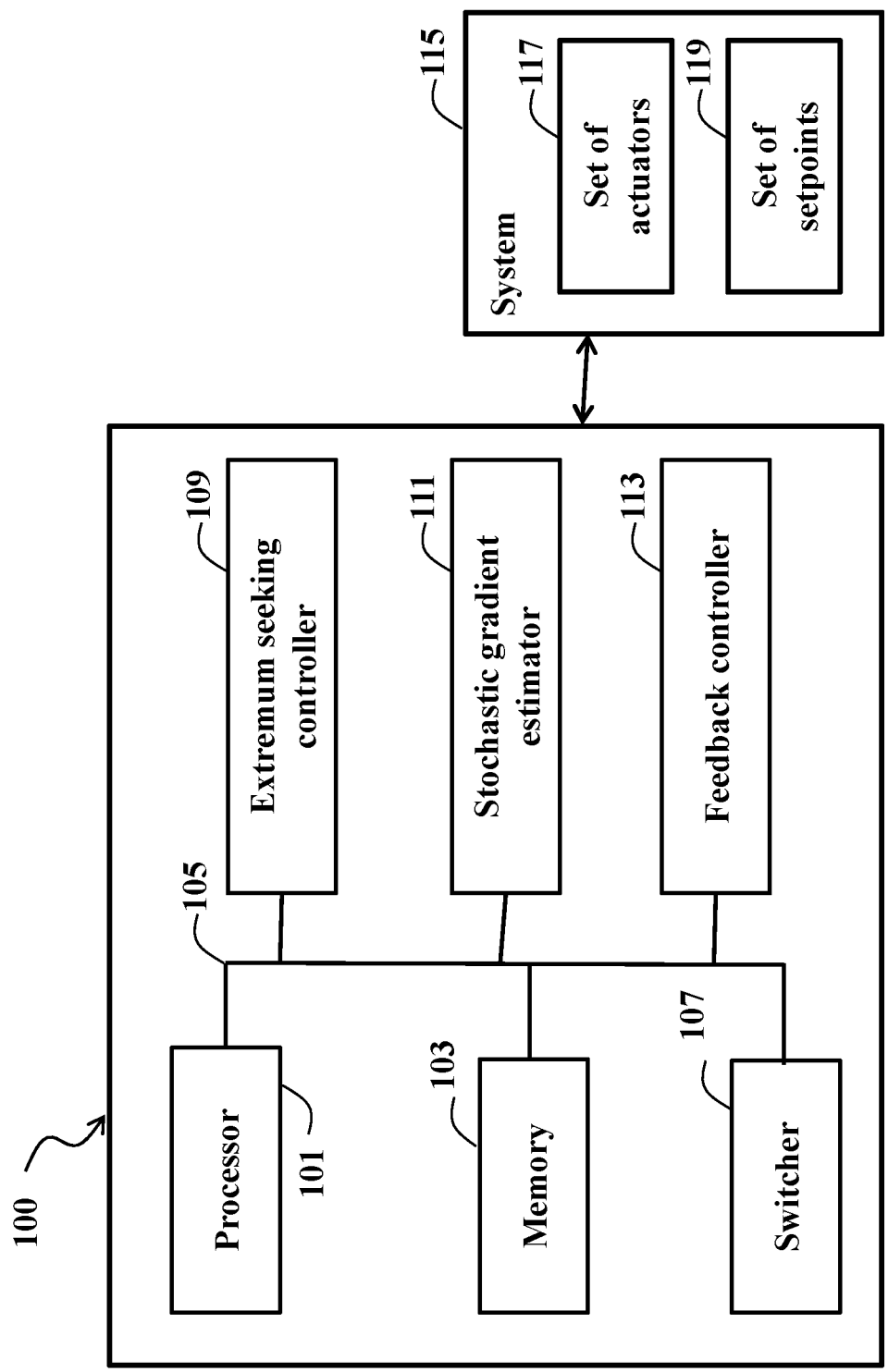
FIG. 1 illustrates a block diagram of a control system for controlling a set of actuators of a system to minimize energy consumption of the system, in accordance with an example embodiment.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

In order to operate a controlled system at a desired optimal setpoint, a set of setpoints corresponding to a set of actuators is required to be tuned such that the set of actuators are tuned to enable the controlled system to achieve the desired optimal setpoint with minimum energy consumption. To that end, an extremum seeking control algorithm may be used. The task of the extremum seeking control algorithm is to find operating setpoints that maximize or minimize an objective function of the controlled system. For example, if the user has defined the optimal setpoint at which the user desires to operate the controlled system to minimize energy consumed (i.e. cost function in this case) by the controlled system, then the extremum seeking control algorithm finds an optimal combination of setpoints to operate the set of actuators 119 of the system 115 such that the system is operated at the desired optimal value with minimized energy consumption.

In order to find/determine the setpoints to operate the set of actuators, the extremum seeking control algorithm perturbs/excites the set of setpoints corresponding to the set of actuators, iteratively, till the controlled system is operated at the desired setpoints. At each iteration, the set of setpoints are updated either incrementally or decreasingly based on the desired optimal setpoint of the controlled system.

Hence, rather than optimizing the performance of a specific actuator of the controlled system, the ESC optimizes the performance of multiple actuators from the set of actuators collectively. Therefore, the ESC needs to estimate a full gradient of cost function for all setpoints of multiple actuators, where the cost function relates values of the subset of setpoints to a cost of operation of the system. For example, the cost function may correspond to energy consumption of the system. Thus, the ESC has to perturb or excite all values of the set of setpoint to first determine the full gradient of the cost function and then perform the optimization of the cost function of the controlled system.

However, optimizing the cost function of the controlled system (for example, optimizing energy consumption of the controlled system) using the ESC may take a very long time if a number of setpoints in the set of setpoints is very large. Further, it is not practical to perturb every single setpoint for various practical reasons such as a size of a state-space, a number of units being tuned, safety considerations that make some set-points too dangerous to perturb otherwise there will be a constraint violation, network failures in distributed control systems, and the likes. Thus, in many situations optimizing the controlled system by minimizing the cost function (such as energy) using the ESC may be suboptimal, computationally expensive, and sometimes even impossible.

For instance, the controlled system comprises 1000 air conditioners (ACs). Accordingly, there are 1000 actuators in the set of actuators and corresponding 1000 setpoints in the set of setpoints. Thus, in order to tune temperature of 1000 ACs, 1000 temperature setpoints may have to be tuned. The ESC may tune, at each ESC iteration, all the 1000 setpoints and compute a resultant cost value. With this cost value, a gradient of the cost value is computed with respect to the setpoints that have changed. Since every setpoint was perturbed, the gradient of the cost function is calculated with respect to every setpoint. However, perturbing all the setpoints at every ESC iteration, is not always practically feasible. To that end, some embodiments are based on realization that only a subset (perhaps 200 out of 1000) of AC units can be perturbed at each ESC iteration. With the partial perturbation, a cost value based on the change of a subset of setpoints is computed, and subsequently, a partial gradient is computed.

For instance, a Set-A is first 200 AC units, a Set-B is the next 200AC units, and so on. At one ESC iteration if only the Set-A units are perturbed, and then the Set-B units are perturbed in the next iteration, and so on, the full gradient of the cost function can be calculated at any ESC iteration. The ESC relies on the full gradient to update setpoints in order to drive the actuators to operate at a desired optimal setpoint provided by the user. Therefore, if the ESC does not calculate a full gradient, the ESC tries to calculate the gradient of change in cost with respect to perturbation in every setpoint. However, as only the subset of setpoints is perturbed in each ESC iteration, the value of gradient may be infinity in some cases. In particular, the ESC relies on the full gradient to update set-point. If the ESC does not receive a full gradient, it tries to calculate the gradient (i.e. (change in cost)/(perturbation in every set-point)) but this denominator is zero for some components (since on 200 not 10,000 units have been perturbed). In such a situation, one of the two following scenarios is possible: either (a) the ESC fails to compute a gradient and therefore, fails to operate the controlled system at the desired optimal set point, or (b) the ESC computes a gradient that perturbs every set-point, even though useful information has only been collected using a subset of set-points. The scenario (b) is much more likely, and results in some setpoints (e.g. setpoints comprised in Set-B, Set-C, and the likes) being updated meaninglessly. In this case, only Set-A setpoints are required to be updated with the information collected off of Set-A perturbations. This results in an overall slowdown of the ESC since every set-point is updated at every ESC iteration.

In order to optimize the controlled system more efficiently, the present disclosure proposes a control system that determines the full gradient of the cost function of all the setpoints of the set of setpoints stochastically based on partial gradients of the cost function for different subsets of setpoints created from the set of setpoints. The proposed control system uses the extremum seeking control with stochastic gradient algorithms. A detailed description of the proposed control system is provided below with reference to FIG. 1.

FIG. 1 illustrates a block diagram of a control system 100 for controlling a set of actuators 117 of a system 115 to minimize energy consumption of the system 115, in accordance with an example embodiment. The control system 100 includes a processor 101 configured to execute stored instructions, and memory 103 that stores instructions that are executable by the processor 101. The processor 101 may be a single core processor, a multi-core processor, a computing cluster, or any number of other configurations. The memory 103 may include random access memory (RAM), read only memory (ROM), flash memory, or any other suitable memory systems. The processor 101 may be connected through the bus 105 to the other components of the control system 100.

The system 115 may receive one or more inputs, such as a specific setpoint (also referred to. as an "optimal setpoint") at which a user desires to operate the system 115. In some embodiments, a user may provide the input to the system 115 via an input interface, where the input interface of the system 115 may be associated with a remote control used to select the optimal setpoint. In another embodiment, the input interface may comprise a dashboard which may be used by the user to select a value of the optimal setpoint. The system 115 comprises a set of actuators 117 configured to control one or more parameters of the system 115 based on the optimal setpoint. The set of actuators 117 may comprise solenoids, electric motors, hydraulic cylinder, pneumatic cylinders, motors, and the like. The system 115 further comprises a set of setpoints 119 a corresponding to the set of actuators 117, where each actuator of the set of actuators 117 is controlled using a corresponding setpoint from the set of setpoints 119. Thus, in order to manipulate the set of actuators 117 of the system 115, the control system 100 manipulates the set of setpoints 119 such that the system 115 is operated at the desired optimal setpoint with minimum energy consumption by the system 115.

The control system 100 initially creates a plurality of subsets of setpoints from the set of setpoints. In order to create the plurality of subsets of setpoints, the control system 100 has a switcher (or switcher module) 107. The switcher 107 is configured to create a plurality of subsets of setpoints from the set of setpoints 119. The subset of setpoints may be created based on one or more constraints, where the one or more constraints comprises at least one of physical constraints of the system 115 such as maximum operable limit of the system 115, legal constraints, for example legally allowed speed of operation of the system 115, and business constraints such as minimization of overall energy consumption. In some embodiments, the plurality of subsets of setpoints may be created either randomly or deterministically, where at least some combinations of the subsets intersect i.e. the at least some combinations have common setpoints. In another embodiment, the combination of the subsets may be kept disjoint i.e. there is no common setpoint between any two or more subsets.

The switcher 107 is further configured to select a subset of setpoints from the plurality of subsets of setpoints, where the subset of setpoints controls the corresponding subset of actuators from the set of actuators 117. In order to select the subset of setpoints, the switcher 107 is configured to select subset of actuators from the set of actuators 117, where the subset of actuators may be selected randomly. In another embodiment, the subset of actuators may be selected deterministically based on the one or more constraints. In some embodiments, the subset of actuators may be selected semi-randomly. For example, assume that at least some actuators of the set of actuators 117 consume more energy than the remaining actuators. In this case, actuators in the set of actuators 117 may be weighted for selection, by the switcher 107, in a subset, where the weight may be a function of energy consumption by an actuator of the set of actuators 117.

In an example embodiment, the switcher 107 may correspond to a scheduler, where the scheduler schedules a subset of setpoints or a subset of actuators to be perturbed in the next ESC iteration. The scheduler may schedule the subset of setpoints or the subset of actuators randomly or deterministically based on the one or more constraints or semi-randomly. The scheduler schedules a perturbation of every set-point within a finite duration of time.

Further, one or more setpoints in the subset of setpoints are perturbed such that a state of the system 115 is driven towards a state corresponding to the optimal setpoint such that the system is operated with minimum energy consumption.

To that end, the control system 100 uses an extremum seeking controller (ESC) 109 that implements the extremum seeking control algorithm. The ESC 109 is configured to perturb one or more setpoints of the selected subset of setpoints at each iteration of the ESC 109 (also called as ESC iteration). In order to perturb one or more setpoints, the ESC 109 uses a dither signal at the one or more setpoints. In some example embodiments, the dither signal corresponds to a sinusoidal signal. Further, the perturbation of the one or more setpoints of the selected subset of setpoints is based on a first-order moment and a second order moment of a probabilistic distribution of the partial gradients of the cost function generated by a stochastic gradient estimator 111, where the cost function provides a relation between values of the subset of setpoints to a cost of operation of the system. In an example embodiment, the cost function may correspond to an entity or function defined by the user which the user wants to minimize or maximize For example, the cost function may correspond to a steady-state output power of a room-air-conditioning i.e. heating/cooling cycle. Inputs of the cost function are setpoints to be optimized e.g. expansion valve positions, fan speeds, compressor frequencies, discharge temperatures, and the likes. These are measurable outputs of the closed-loop control system that an internal control law can track.

Further, the probabilistic distribution of the partial gradients may be generated from a partial gradient generated at a current ESC iteration and partial gradients generated at the previous ESC iterations.

To that end, the control system 100 includes the stochastic gradient estimator 111. The stochastic gradient estimator 111 initially determines a partial gradient associated with the selected subset of setpoints. The partial gradient corresponds to a gradient of the cost function with respect to the selected subset of setpoints, where one or more setpoints of the selected subset of setpoints are perturbed. Further, the stochastic gradient estimator 111 generates the probabilistic distribution of the partial gradients obtained at each ESC iteration associated with the selected (or current) subset of setpoints and the previously selected subset of setpoints. The stochastic gradient estimator 111 further computes moments: first-order: mean, and second-order: variance of the probabilistic distribution of partial gradients, to keep a statistical estimate of the full gradient. More specifically, each time the stochastic gradient estimator 111 gets a partial gradient of a subset of setpoints, a distribution from all the past and current partial gradients is computed and a mean and variance of the distribution is computed. Based on the mean and the variance, the stochastic gradient estimator 111 determines an estimate of the full gradient of the cost function.

The estimated full gradient serves as a proxy for the full gradient, as long as every set-point is eventually perturbed to determine actual full gradient of the cost function. Thus, based on the estimated full gradient, the ESC 109 can perturb the next one or more setpoints of the next subset of setpoints without waiting till the full gradient is calculated. The control system 100 continues to drive the state of the system 115 towards an optimal state corresponding to the optimal set point with the estimated full gradient without waiting for the actual full gradient.

The mean of the distribution of the partial gradients provides an estimation of full-gradient, and therefore provides a direction in which the setpoints are required to move (i.e. whether to increase or decrease the perturbation) to get the most likely next best setpoint for every set-point. Further, the variance of the distribution of the partial gradients also provides information associate with the estimation of the full gradient. For example, based on the variance, a step size associated with increase or decrease of the setpoints may be determined. The stochastic gradient estimator 111 enables the control system 100 to optimize cost function associated with the system 115 based on the estimate of the full gradient at each iteration of ESC (or ESC iteration). The stochastic gradient estimator 111 updates the estimation of the full gradient based on the probabilistic distribution of the partial gradients generated at each ESC iteration.

The stochastic gradient estimator 111 implements at least one stochastic gradient descent algorithm, where the stochastic gradient descent algorithms comprise, but are not limited to, adaptive momentum estimation (Adam) algorithm, adaptive gradient (Adagrad) algorithm, and root mean square propagation (RMSprop) algorithm.

The stochastic gradient estimator 111 and the ESC 109 jointly implement a stochastic extremum seeking (SES) control algorithm to manipulate one or more actuators by perturbing corresponding set points to determine the estimated full gradient, where the SES algorithm comprises the stochastic gradient descent algorithm implemented by the stochastic gradient estimator 111 and the extremum seeking control algorithm implemented by the ESC 109.

Further, the control system 100 uses a feedback controller 113 configured to drive the state of the system 115 based on the perturbed subset of setpoints at ESC iteration till a state of the system 115 corresponding to the optimal setpoint (i.e., optimal state) inputted by the user is reached. Thus, the feedback controller 113 keeps feeding back the current state of the system 115 to the ESC 109 to further perturb other subsets of setpoints till the system 115 operated at the optimal state.

Figure 2:
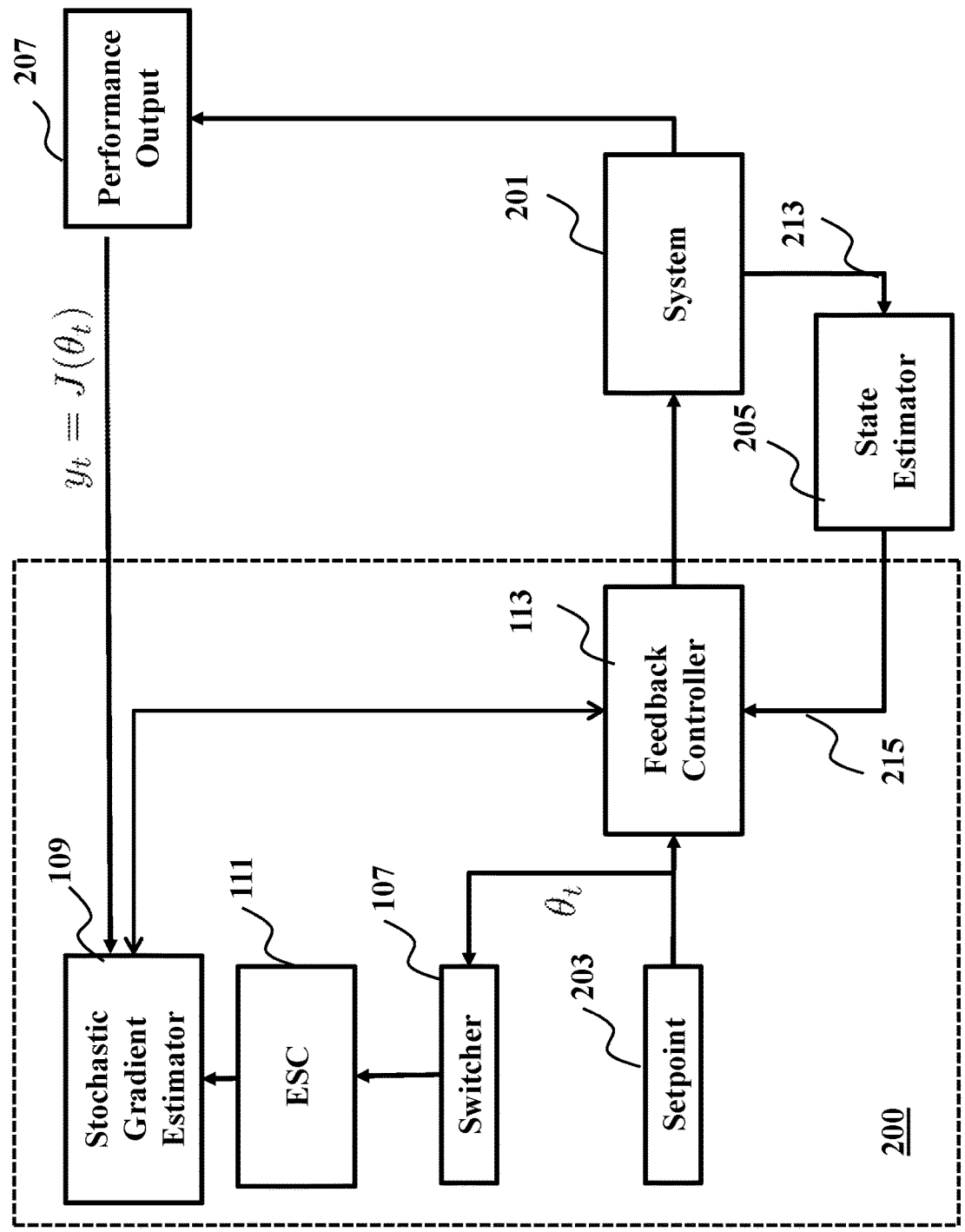
FIG. 2 illustrates a workflow of a control system implemented with a system to minimize energy consumption of the system, in accordance with an example embodiment.

FIG. 2 illustrates a workflow of a control system 200 implemented with a system 201 to minimize energy consumption of the system 201, in accordance with an example embodiment. The control system 200 is analogous to the control system 100 illustrated in FIG. 1. Further, the system 201 corresponds to a system to be controlled by the control system 200. The system 201 to be controlled by the control system 200 may be any system such as a vapour compression system, an air conditioning system, an HVAC system, or the like whose energy consumption is desired to be optimized.

The control system 200 may receive an input setpoint 203 ($\theta_r$) at which the system 201 is desired to be operated. The control system 200 comprises the switcher 107 that obtains the input setpoint 203. The switcher 203 may be provided with a total number of actuators and the corresponding total number of setpoints of the system 201. The switcher 107 may generate a plurality of subsets of setpoints from the setpoints of the system 201 and select at least one subset of setpoints at one instance of time or for one ESC iteration. The selected subset of setpoints is provided to the ESC 109 that perturbs one or more setpoints of the selected subset of setpoints. Further, the perturbed or updated one or more setpoints of the selected subset of setpoints is provided to the stochastic gradient estimator 111, where the stochastic gradient estimator 111 determines a partial gradient of the cost function based on the updated one or more setpoints and estimates the full gradient of the cost function based on a probabilistic distribution of the partial gradients. The output of the stochastic gradient estimator 111 is provided to the feedback controller 113 to control the system 201.

The feedback controller 113 along with a state estimator 205 forms a feedback loop to optimize execution of the system 201 such that a performance output 207 with minimum energy consumption at the inputted setpoint 203 is achieved. Further, the state estimator 205 may comprise one or more sensors to monitor state of the system 201. The feedback controller 113 may obtain a current state of the system 201 from the state estimator 205 and tracks whether a desired state corresponding to input setpoint 203 is reached or not. When it is determined that the desired state is not achieved by the system 201, the feedback controller 113 may initiate extremum seeking control of setpoints using the stochastic gradient method. The setpoint 203 may be pre-determined value at which the system to 201 is desired to be operated.

The control system 200 is a closed-loop system modelled by the dynamics:

$$x_{t+1} = f(x_t, \theta_t) \quad (1)$$

where t denotes the time index, $x \in \mathbb{R}_n$ denotes the state of the system to be controlled 201, and $\theta \in \Theta$ denotes a vector of operating-points that will be designed to drive the system 201 to an equilibrium where the measured steady-state power output (i.e. the cost function):

$$y_t = J(\theta_t) := \tilde{J}(\pi_\infty(\theta_t)) \quad (2)$$

attains its minimum. For example, in case where the system 201 comprises a vapour compression system, θ could be a position of an electronically actuated valve, or fan speeds, and combinations thereof. It is assumed that the function J is strongly convex on the set of admissible references Θ and admits an optimum. That is, there exists a $\theta^* \in \Theta$ such that $\nabla J(\theta^*) = 0$, and there exists a $\chi > 0$ such that $\nabla^2 J(\theta) \succcurlyeq \chi I$ for every $\theta \in \Theta$. Here, $\Theta \subset \mathbb{R}^p$ denotes a known admissible set of parameters; for example, a range of fan speeds in the vapour compression system. The nonlinearity $f$ is assumed to be twice continuously differentiable but is not required to be known. The measured output $y \in \mathbb{R}^p$ denotes the steady-state power output of the system 201, and $\pi_\infty(\cdot)$ is a mapping from operating-points to equilibrium states; that is $f(\pi_\infty(\theta), \theta) = 0$.

Further, the present disclosure provides a method of driving $\theta_t \to \theta^*$ and therefore minimizing the steady state power as $t \to \infty$. Since there is no simple mathematical representation of standard gradient-based optimization methods cannot be used to derive the optimal operating point (or set-point) $\theta^* = \arg \min J(\theta)$. The problem of optimizing θ is further exacerbated by the presence of nonlinear, complex, and multi-rate dynamics within the system 201, itself.

The control system 200 may have a plurality of actuators (as described in FIG. 1) that may be used to control one or more elements of the system 201, where the one or more elements control one or more functions of the system 201. For example, a first actuator of the control system 200 may be used to control fan speed (element 1) of the system 201, a second actuator may be used to control compressor (element 2) of the system 201, and the likes.

In an example embodiment, the control system 200 may be triggered to optimize energy consumption on determination that at least one element of the system 201 is non-controllable using control inputs. The control system 200 may use a state estimator 205 to monitor all elements of the system 201 and obtains 213 state of each element. Based on the obtained 213 state of each element, the state estimator 205 determines that at least one element is non-controllable. The element may become non-controllable when the value of control input to the actuator controlling the element is pre-determined or fixed by a user in real-time. In another embodiment, the connection to the actuator controlling the element may be lost due to some unforeseen reasons such as accidentally.

On triggering, the control system 200 uses a stochastic extremum seeking algorithm (i.e. extremum seeking control using stochastic gradient algorithm) to determine an operating point of each element of the system 201 such that the system 201 is operated at the inputted setpoint 203. Further, the determined operating point of each element is used by the control system 200 to optimize the working of the corresponding elements of the system 201 such that the system 201 can be operated at the inputted setpoint 203 with minimum power consumption.

The control system 200 uses data obtained during operation including a history of operating-points, measured performance outputs 207 (such as power) to adapt a step-size of the operating-point (set-point) optimization algorithm based on gradient estimates obtained from the data history such as stochastic extremum seeking algorithm. The operating-point is updated at each iteration on-line, where between operating-point update iterations, the system 201 controlled by the feedback controller 113 is allowed to reach steady-state dynamics. Unlike conventional extremum seeking control (ESC) methods, all operating-points may not be available for actuation at every given time, that is a subset of all operating-points may be controllable at a given time, and which subset is available at that time step may not be known at design time. Therefore, the full gradient is estimated based on operating-point data where certain components or channels are not changing at every time instant—this can be modelled as a stochastic gradient, motivating the use of stochastic gradient optimization methods commonly used in training machine learning algorithms.

Further, the state of each element of the system 201 is monitored by the state estimator 205 in real-time and provides 215 monitoring data to the feedback controller 113 which enables the control system 200 to further optimize the operating points of elements of the system 201 whenever required.

Some embodiments are based on the realization that stochastic gradient optimization can be used in extremum seeking control to automatically adapt gain of the control system 200 based on the smoothness of the function in a local neighbourhood.

Some embodiments provide a mechanism for adjusting the step-size of the perturbation given to one or more setpoints based on gradient data histories. Let $m_t$ and $v_t$ denote the current mean and standard deviation computed using the last N gradient estimates $g_{t-N+1}, \ldots g_t$, respectively. The accelerated control system 200 has the form $$\theta_{t+1} = \theta_t - k_t \frac{m_t}{\sqrt{v_t + \epsilon}} + d_t \quad (3)$$

$$m_{t+1} = \beta_1 m_t + (1-\beta_1) g_t \quad (4)$$

$$v_{t+1} = \beta_2 v_t + (1-\beta_2) g_t \odot g_t \quad (5)$$

where $$k_t = k_g \frac{\sqrt{1-\beta_2^t}}{(1-\beta_1^t)} \quad (6)$$

where $k_t$ is an effective step-size, and $\epsilon > 0$ is a scalar that ensures that $v_t + \epsilon > 0$.

Figure 3A:
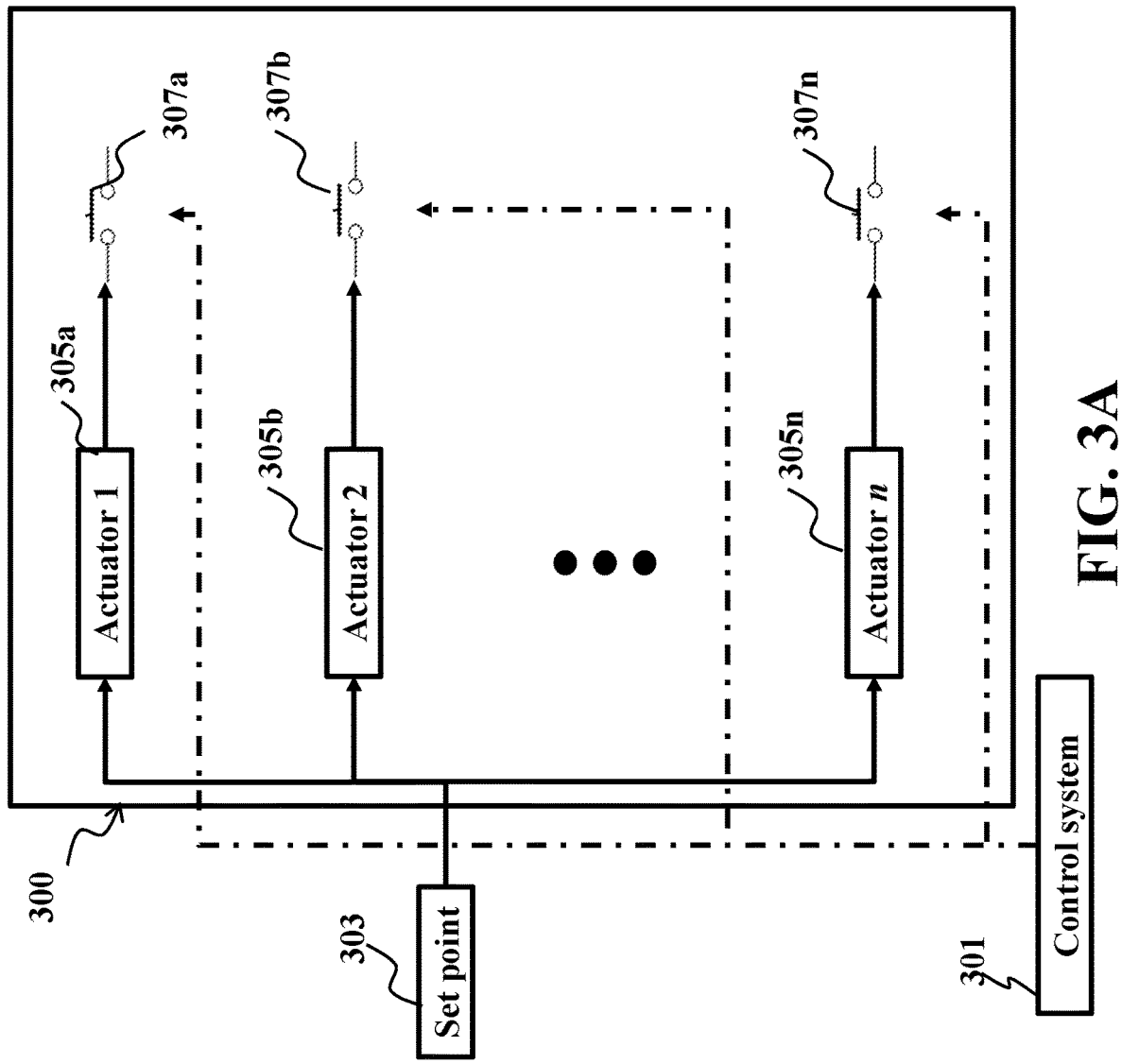
FIG. 3A illustrates a plurality of actuators of a system controlled by a control system to minimize energy consumption at a specific set point, in accordance with an example embodiment.

FIG. 3A illustrates a plurality of actuators of a system 300 controlled by a control system 301 to minimize energy consumption at a specific set point 303, in accordance with an example embodiment. The control system 301 corresponds to the control system 100 illustrated in FIG. 1. FIG. 3A is described below in conjunction with FIG. 1.

The system 300 comprises the plurality of actuators such as an actuator 1, an actuator 2, and an actuator n (hereinafter referred as a plurality of actuators 305a, 305b, . . . , 305n (also called as 305a-305n)). Each actuator of the plurality of actuators 305a-305n is connected to a corresponding switch from the plurality of switches 307a, 307b, . . . , 307n (also called as 307a-307n). The switches 307a-307n may be associated with control inputs and are used to control the corresponding actuator from the plurality of actuators 305a-305n.

The system 300 may receive a value of a specific set point 303 as an input. In some embodiments, the value of the set point 303 may be predefined. In another embodiment, the value of set point 303 is provided by a user in real time. The set point 303 is a parameter at which the system 300 is desired to be operated. For example, in a system associated with an air conditioner (AC), the set point 300 may be a value of temperature (for example 22 degrees Celsius or the likes) at which the AC system is desired to be operated.

In an example embodiment, control system 301 may control the plurality of actuators 305a-305n at specific operating points based on the received specific set point for the system 300. On reception of the set point 303, the control system 301 controls the plurality of actuators 305a-305n to operate the system 300 at the desired set point 303. The system 300 may comprise sensors (not shown in FIG. 3A) which may be used to detect a state of each actuator of the plurality of actuators 305a-305n. The state of an actuator may provide information such as whether the actuator is controllable or non-controllable by using the corresponding control input or not.

An actuator may be non-controllable when a control input to the actuator is specified by the user during real-time operation. In another embodiment, the actuator is non-controllable when a connection to the actuator is lost due to any unforeseen reasons which may further result in large energy consumption.

The control system 301 determines whether any actuator of the plurality of actuators 305a-305n is non-controllable by determining connections of the plurality of actuators 305a-305n with their corresponding control switch of the plurality of switches 307a-307n. To that end, the plurality of actuators 305a-305n is continuously monitored. In case the connection of one or more of the plurality of actuators 305a-305n with their corresponding switch of the plurality of switches 307a-307n is lost, the one or more of the plurality of actuators 305a-305n are determined as non-controllable.

Based on the determination that one or more actuators of the plurality of actuators 305a-305n are non-controllable, the control system 301 executes stochastic extremum seeking (SES) algorithm by using the extremum seeking controller 109 and the stochastic gradient estimator 111. The SES algorithm is executed to manipulate remaining controllable actuators from the plurality of actuators 305a-305n to operate the system 300 at the specified set point 303 with minimum energy consumption.

To that end, the control system 301 creates a plurality of subsets of setpoints from a set of setpoints corresponding to the plurality of actuators 305a-305n. The set of setpoints may be used to control the plurality of actuators 305a-305n. In an embodiment, the set of setpoints of the actuators 305a-305n may be adjusted by using the switches 307a-307n. Further, one subset of setpoints may be selected and one or more setpoints, corresponding to the controllable actuators, in the subset of setpoints are perturbed. The one or more perturbed setpoints are used to determine a partial gradient of the selected subset of setpoints. Further, a probabilistic distribution of partial gradients is determined based on the partial gradient corresponding to the selected subset and historical partial gradients corresponding to previously selected subsets. Further, statistical parameters such as mean and variance of the probabilistic distribution are determined. Based on the statistical parameters a full gradient is estimated and further, it is determined whether to increase or decrease perturbation at each setpoint. Further, the statistical parameters are used to determine a step size by which the perturbation of the setpoints is increased or decreased. State of the system 300 is driven to a state corresponding to the perturbed setpoints, where the state is monitored in order to determine whether an optimal state of the system 300, corresponding to the input setpoint 303, is reached or not. Based on the state of the system 300, the control system 301 may continue perturbation of the one or more setpoints corresponding to controllable actuators until the optimal state of the system 300 is achieved.

Figure 3B:
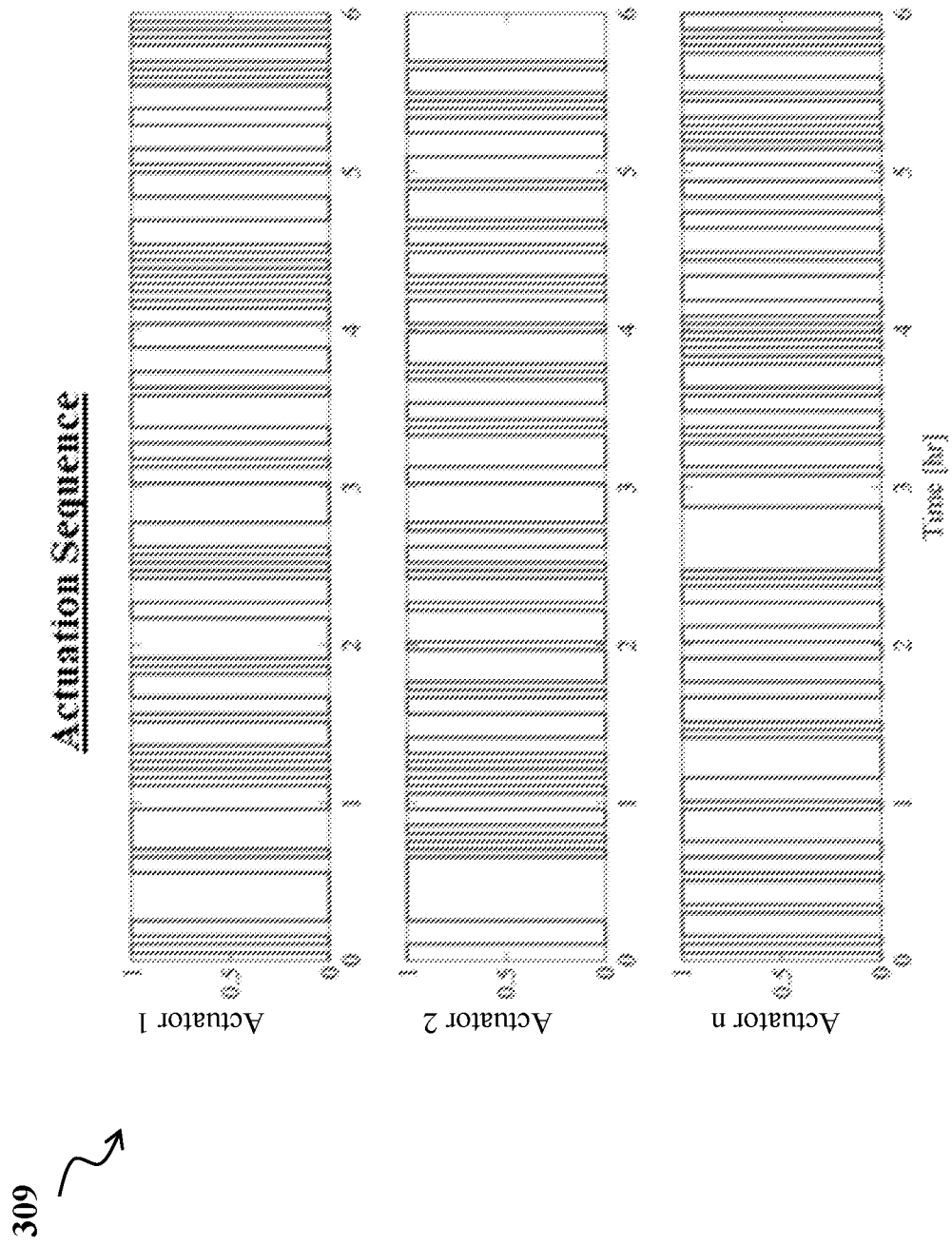
FIG. 3B illustrates a binary sequence of actuator status flags, in accordance with an example embodiment.

FIG. 3B illustrates a binary sequence 309 of actuator status flags, in accordance with an example embodiment. FIG. 3B is described below in conjunction with FIG. 3A. The binary sequence 309 of actuator status flags is the result of controlling the plurality of actuators 305a-305n via corresponding control switches 307a-307n. A plot of status of each actuator is comprises time on X-axis and status (ON equivalent to 1 and OFF equivalent to 0) on Y-axis.

Figure 4A:
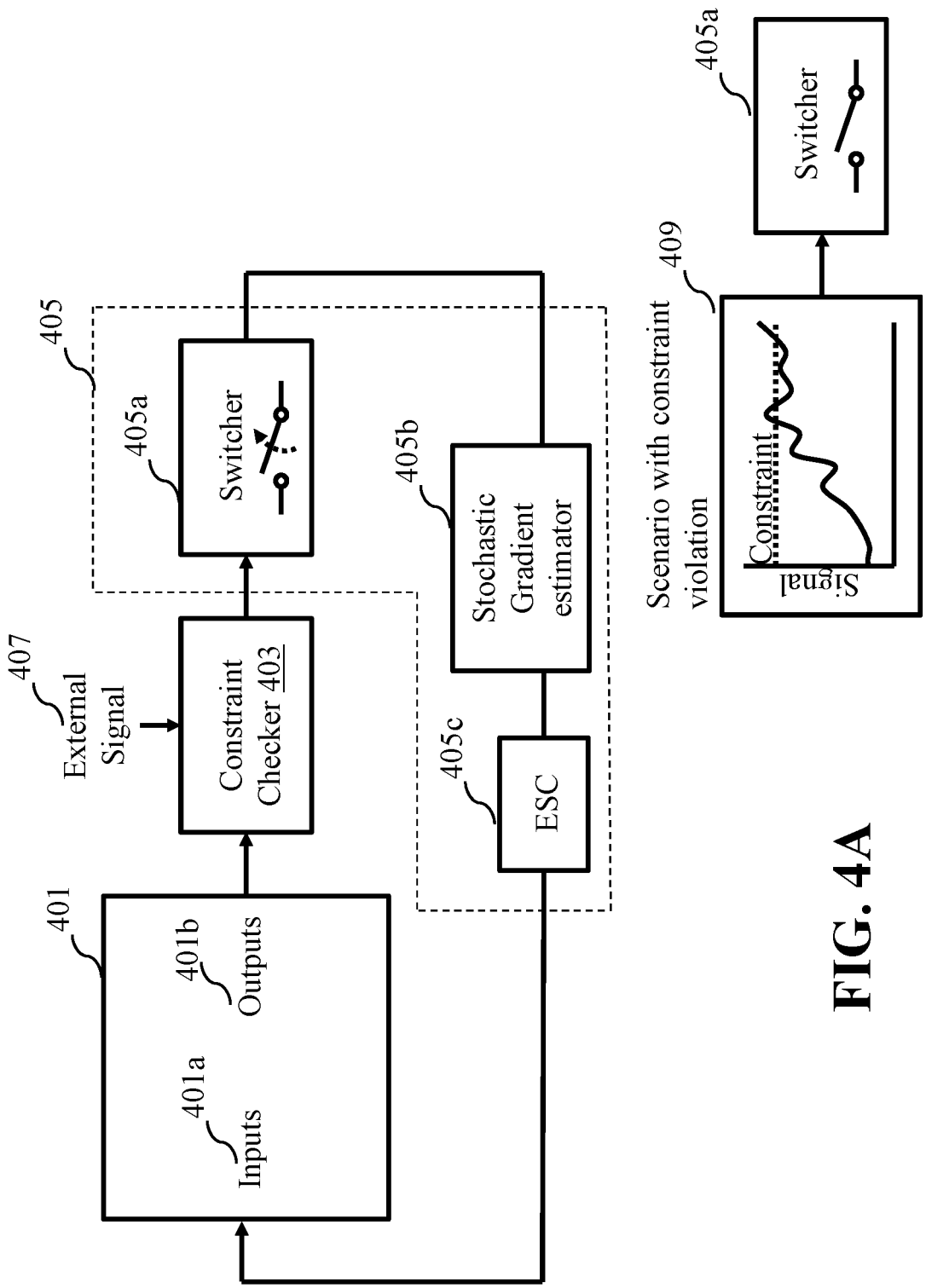
FIG. 4A illustrates selection of a subset of actuators of the system, by a switcher, based on operational constraints of the system, in accordance with an example embodiment.vapour

FIG. 4A illustrates selection of a subset of actuators of the system 403, by a switcher, based on operational constraints of the system 403, in accordance with an example embodiment.vapour For example, the system 403 corresponds to a vapour compressor system, where vapour compressor system may comprise different actuators such as compressor temperature, compressor speed, a position of an expansion valve, and a position of a flow reversing valve. The vapour compressor system is connected to a control system 405 configured to control actuators of the vapour compressor system in order to minimize energy consumption by the vapour compressor system. To that end, the control system 405 uses the stochastic extremum seeking (SES) algorithm iteratively (i.e., in each ESC iteration). The SES algorithm is implemented using the extremum seeking controller 405c and the stochastic gradient estimator 405b. The control system 405 corresponds to the control system 100 illustrated in FIG. 1. Further, the switcher 405a, the stochastic gradient estimator 405b and the ESC 405c correspond to the switcher 107, the stochastic gradient estimator 111, and the ESC 109, respectively as illustrated in FIG. 1. The vapour compressor system is connected to the control system 405 via a constraint checker 403.

Further, the operational constraints comprise at least one of input constraints to input 401a of the vapour compressor system and output constraints to output 401b of the vapour compressor system. Considering the output constraints for the vapour compressor system, after a previous choice of setpoints in previous ESC iteration for one or more actuators of the vapour compressor system, it is possible that one important performance variable or actuator (such as the compressor temperature) is close to exceeding a specified maximum constraint. In this case, the switcher 405a chooses a subset of inputs (i.e., actuators) for the next ESC iteration to obtain a gradient such that the compressor temperature constraint is not violated. To that end, the control system 405 may not change the compressor temperature in the next ESC iteration. However, the control system 405 may select a subset of actuators comprising position of the expansion valve and position of the flow reversing valve, where the position of the expansion valve and/or flow reversing valve can be opened (or changed) in the next ESC iteration.

The input constraints have a similar effect on the vapour compressor system. For example, an increase in the compressor speed and a decrease in the opening of the expansion valve both have the effect of increasing the magnitude of the pressure difference across the vapour compressor system. A user may not want to simultaneously apply these changes to both of the actuators to avoid high pressure differences and potential equipment (or vapour compressor system) damage. This limitation would cause the switcher 405a to again select a subset of actuators whose setpoints may be perturbed in the next ESC iteration such that the vapour compressor system is not damaged.

These input and output constraints can also interact; for example, the application of an increased compressor speed and decreased expansion valve opening may not have been known to be problematic at a priori but may violate a constraint (constraint violation 409) on the maximum compressor temperature as the vapour compressor system responds to the applied setpoint values of actuators at a given time step. Thus, the control system 405 is required to change the input setpoint values of actuators of the vapour compressor system to avoid the constraint violation 409 before the gradient has been estimated at the given time step. This effectively results in selecting a subset of the actuators at the given time step, rather than allowing all actuators to move.

In another embodiment, suppose that the system 403 corresponds to a set of systems, where each system is a heating, ventilation, and air conditioning (HVAC) system. The system 403 or the set of systems preclude all actuators from being used. Suppose that 10 HVAC systems are being used to regulate ventilation and air conditioning of a building. When the total electrical capacity for the building is specified, there is an expectation that not all systems will be simultaneously drawing their maximum power, for example when compressor speed in each HVAC system is at its upper limit The maximum power consumption for an HVAC system may be 2× or greater than the rated power consumption. If a coordinated ESC method directs all of the compressors to run at their maximum speeds, this could exceed the total building power consumption and cause accidents such as building circuit breakers to trip or worse. In order to resolve the problem, an external signal 407 is provided as input to the switcher 405a. The external signal 407 may comprise current power consumption in the building. The switcher 405a could use the external signal 407 to determine how many actuators, for example, compressors, the switcher 405a can actuate to avoid exceeding the limits or constraints on electrical power consumption.

Figure 4B:
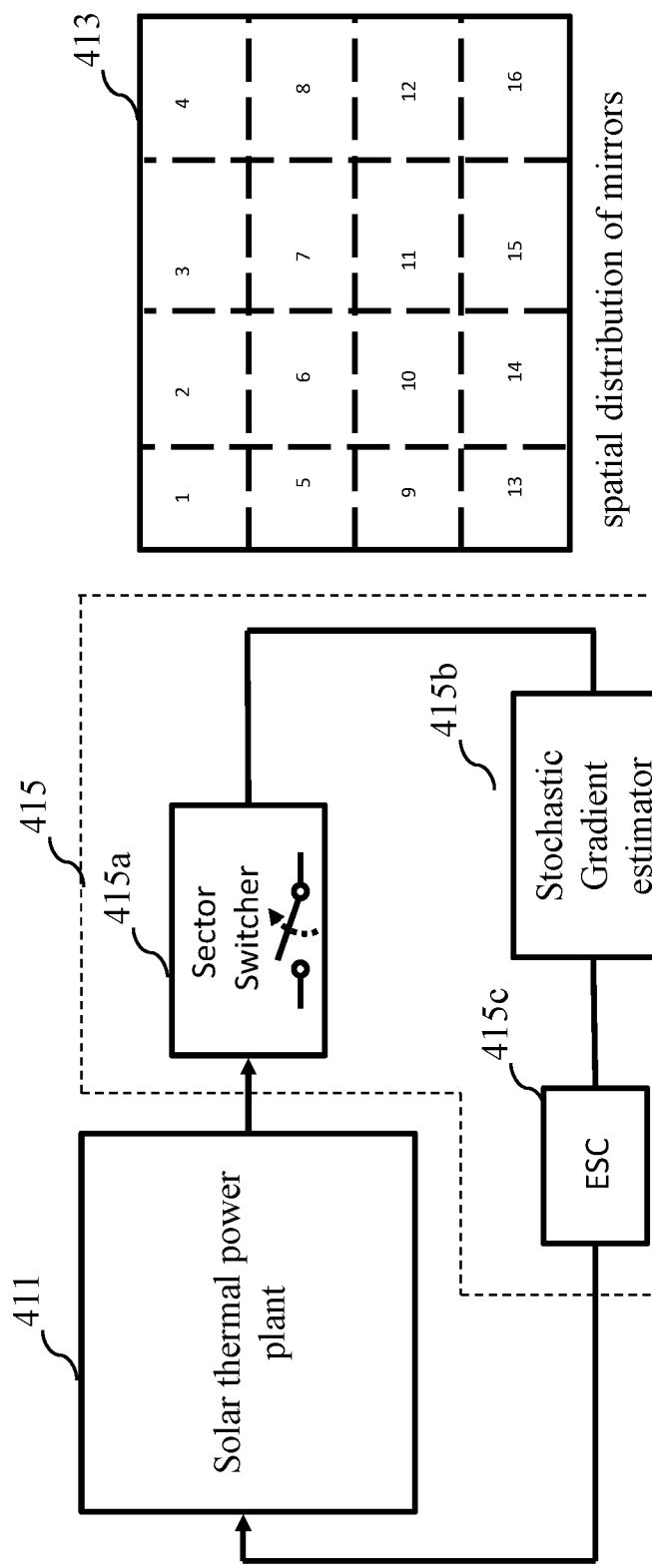
FIG. 4B illustrates a solar thermal power plant comprising a solar concentrating mirror that is controlled by the control system, in accordance with an example embodiment.

FIG. 4B illustrates a solar thermal power plant 411 comprising a solar concentrating mirror 413 this is controlled by a control system 415, in accordance with an example embodiment. The control system 415 corresponds to the control system 100 illustrated in FIG. 1. The solar concentrating mirror 413 comprises sectors 1, 2, 3, . . . , 16, where each sector comprises a set of mirrors, where the set of mirrors are spatially distributed in the corresponding sector. Some embodiments are based on the realization that changing mirror positions in all the spatial sectors have a significant and drastic effect on the overall plant performance. In this case, mirror positions in each sector may be required, as the mirror positions are to be controlled or actuated separately to avoid unwanted effects on the solar thermal power plant 411. To adjust the positions of mirrors in each sector, the solar thermal power plant 411 is connected to the control system 415, where the control system 415 comprises a sector switcher 415, a stochastic gradient estimator 415b, and an ESC 415c. Further, the sector switcher 415a, the stochastic gradient estimator 415b and the ESC 415c correspond to the switcher 107, the stochastic gradient estimator 111, and the ESC 109, respectively, illustrated in FIG. 1.

In order to avoid a potential likelihood of a drastic effect on the overall plant performance, the control system 415 is used to only modify (or change) positions for one spatial sector of the solar concentrating mirror 413 at a time. To that end, the control system 415 uses the SES algorithm implemented by the ESC 415c and the stochastic gradient estimator 415b, where by using the SES algorithm partial gradients are obtained in each ESC iteration. Further, the partial gradients are used to compute an estimated full gradient which is used to modify positions for one spatial sector much faster without waiting for the actual full gradient to be calculated that requires modification through all of the spatial sectors.

Figure 5:
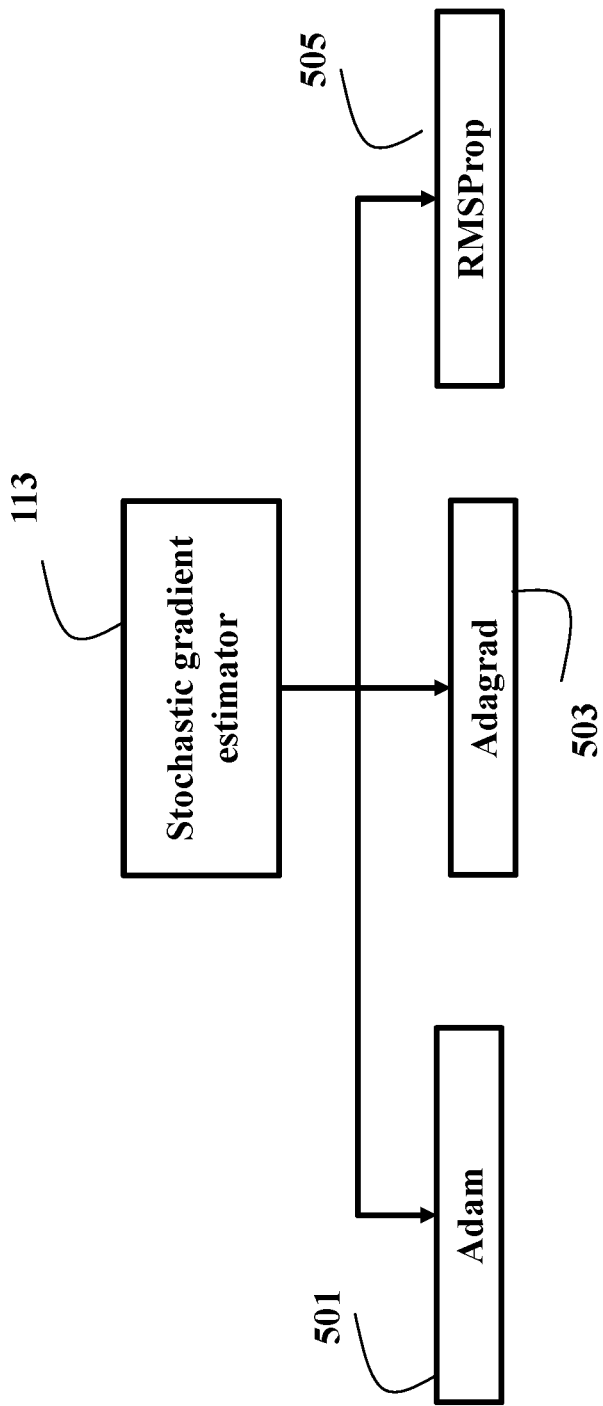
FIG. 5 illustrates different algorithms implemented by the stochastic gradient estimator, in accordance with an example embodiment.

FIG. 5 illustrates different algorithms implemented by the stochastic gradient estimator 111, in accordance with an example embodiment. The algorithms are based on stochastic gradients descent. These algorithms leverage not only the gradient but also their statistics, leading to robust estimates of the full gradient. They also contain momentum-based mechanisms to quickly identify step-sizes to improve convergence speed. Examples include, but not limited to, Adam 501, adaptive gradient (AdaGrad) 503, and root mean square propagation (RMSprop) 505. In an example embodiment, the stochastic gradient estimator 111 may be implemented using a neural network model, which is used to implement one or more stochastic gradient algorithms mentioned below.

AdaGrad

AdaGrad (for adaptive gradient algorithm) is a modified stochastic gradient descent algorithm with per-parameter learning rate. AdaGrad increases the learning rate for sparser parameters and decreases the learning rate for ones that are less sparse. Therefore, AdaGrad improves convergence performance over standard stochastic gradient descent in settings where data is sparse and sparse parameters are more informative. It still has a base learning rate but this is multiplied with the elements of a vector {Gj,j} which is the diagonal of the outer product matrix.

where $g_\tau = \nabla Q_i(w)$, the gradient, at iteration $\tau$. The diagonal is given by $$G_{j,j} = \Sigma_{\tau=1}^t g_{\tau,j}^2 \qquad (8)$$

This vector is updated after every iteration. The formula for an update is $$w := w - \eta \text{diag}(G)^{-1/2} \cdot g \qquad (9)$$

where "·" represents element-wise multiplication. Equation (9) may also be written as per-parameter updates $$w_j \approx w_j - \frac{\eta}{\sqrt{G_{i,j}}} g_j \qquad (10)$$

Each {G(i,i)} gives rise to a scaling factor for the learning rate that applies to a single parameter $w_i$. Since the denominator in this factor, $$\sqrt{G_i} = \sqrt{\sum_{\tau=1}^t g_\tau^2}$$

is the $l_2$ norm of previous derivatives, extreme parameter updates get dampened, while parameters that get few or small updates receive higher learning rates.

RMSProp

RMSProp is also a method in which the learning rate is adapted for each of the parameters. The RMSProp divides the learning rate for a weight by a running average of the magnitudes of recent gradients for that weight. So, first the running average is calculated in terms of means square, $$v(w, t) := \gamma v(w, t-1) + (1-\gamma)(\nabla Q_i(w)^2) \quad (11)$$

where $\gamma$ is the forgetting factor.
And the parameters are updated as, $$w \approx w - \frac{\eta}{\sqrt{v(w, t)}} \nabla Q_i(w) \quad (12)$$

RMSProp is capable to work with mini-batches as well opposed to only full-batches.

Adam

Adam is an update to the RMSProp optimizer. In this optimization algorithm, running averages of both the gradients and the second moments of the gradients are used. Given parameters $w^{(t)}$ and a loss function $L^{(t)}$, where t indexes the current training iteration (indexed at 0), Adam's parameter update is given by:

$$m_w^{(t+1)} \leftarrow \beta_1 m_w^{(t)} + (1 - \beta_1)\nabla_w L^{(t)} \quad (13)$$

$$v_w^{(t+1)} \leftarrow \beta_2 v_w^{(t)} + (1 - \beta_2)(\nabla_w L^{(t)})^2 \quad (14)$$

$$\hat{m}_w = \frac{m_w^{(t+1)}}{1 - \beta_1^{t+1}} \quad (15)$$

$$\hat{v}_w = \frac{v_w^{(t+1)}}{1 - \beta_2^{t+1}} \quad (16)$$

$$w^{(t+1)} \leftarrow w^{(t)} - \eta \frac{\hat{m}_w}{\sqrt{\hat{v}_w} + \epsilon} \quad (17)$$

where $\epsilon$ is a small scalar (e.g. $10^{-8}$) used to prevent division by 0, and $\beta_1$ (e.g. 0.9) and $\beta_2$ (e.g. 0.999) are the forgetting factors for gradients and second moments of gradients, respectively. Squaring and square-rooting is done element-wise.

Figure 6:
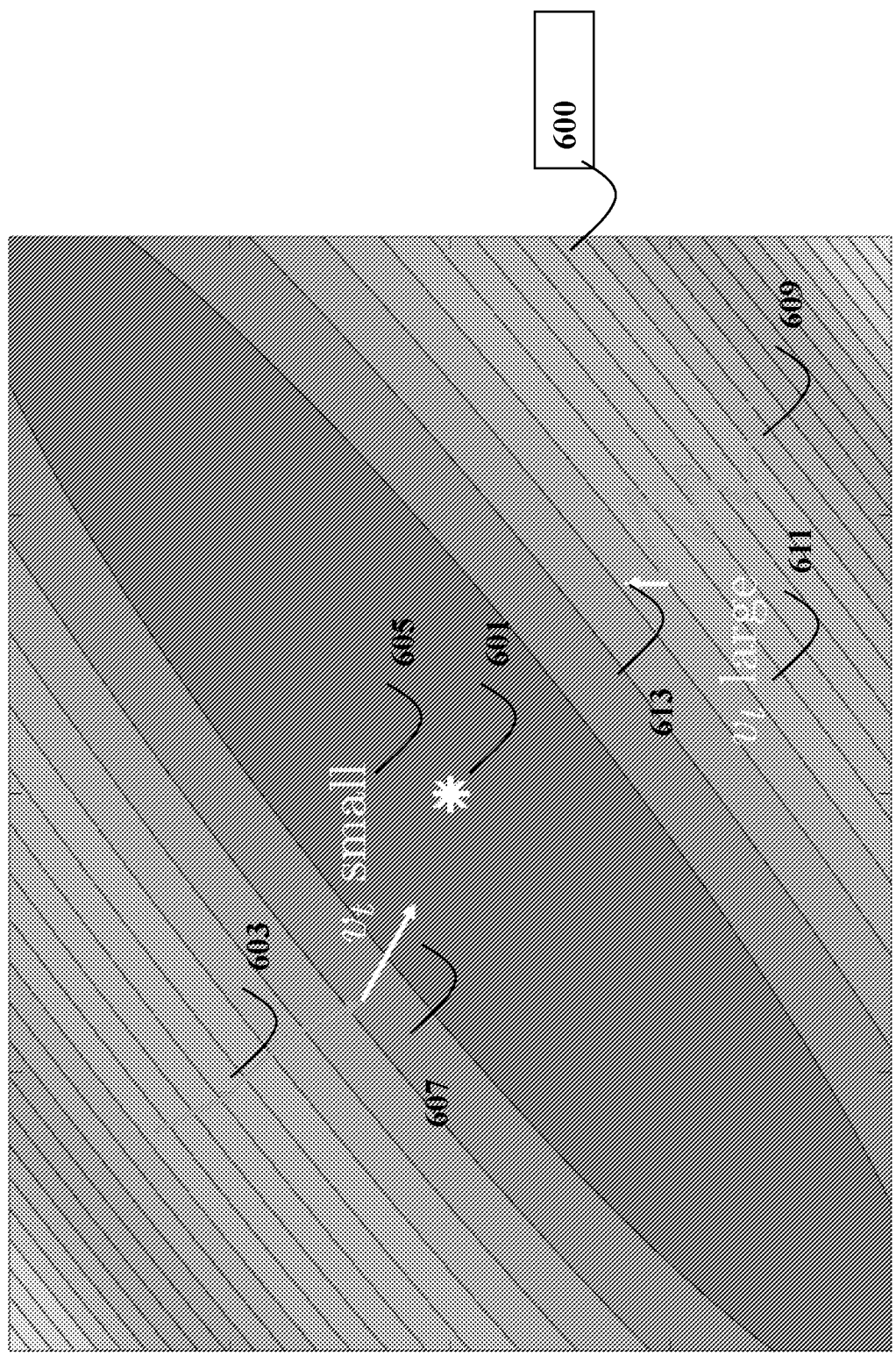
FIG. 6 illustrates a principle by which a gain of the control system is adapted, in accordance with an example embodiment.

FIG. 6 illustrates a principle by which a gain of the control system 100 is adapted, in accordance with an example embodiment. FIG. 6 illustrates level sets of a cost function 600 to be optimized, and the optimizer is shown by the asterisk mark 601. Concretely, two cases are considered: the top left trajectory 603, where the estimated gradients are consistently in the same direction with little variation, therefore, the mean estimated gradient $m_t$ is similar over iterations, and the variance $v_t$ is small 605. Therefore, the element-wise ratio $$\frac{m_t}{\sqrt{v_t} + \epsilon}$$

is large, and allows the control system 100 to take a more aggressive step 607 in the descent direction. Another case is illustrated by the bottom right trajectory 609, wherein the estimated gradients are noisy, and therefore the variance $v_t$ is large 611: this ensures that the ratio $$\frac{m_t}{\sqrt{v_t} + \epsilon}$$

is small, resulting in a smaller control gain and cautious movement 613 in the descent direction.

The gain adaptation works well when the number of operating-points is large, such as operating conditions of a power grid or a cluster of buildings, or when there are operational constraints that prevent all the operating-point updates from being actuated at every iteration. In such settings, it is not possible to always change the entire vector of operating-points or obtain all the measured power outputs synchronously. Therefore, only a subset of operating-points can change, and only a subset of gradients can be estimated. By evaluating the statistics of a history of gradients as in the Adam algorithm 501, an estimate of the full gradient vector may be obtained. Thus, adaptive gradients like Adam 501 are well-suited to these large-scale problems since they are primarily used for mini-batch gradient-based updates in training deep neural networks, where random subsets of gradients are used to find search directions that lead to a local optimum.

Figure 7:
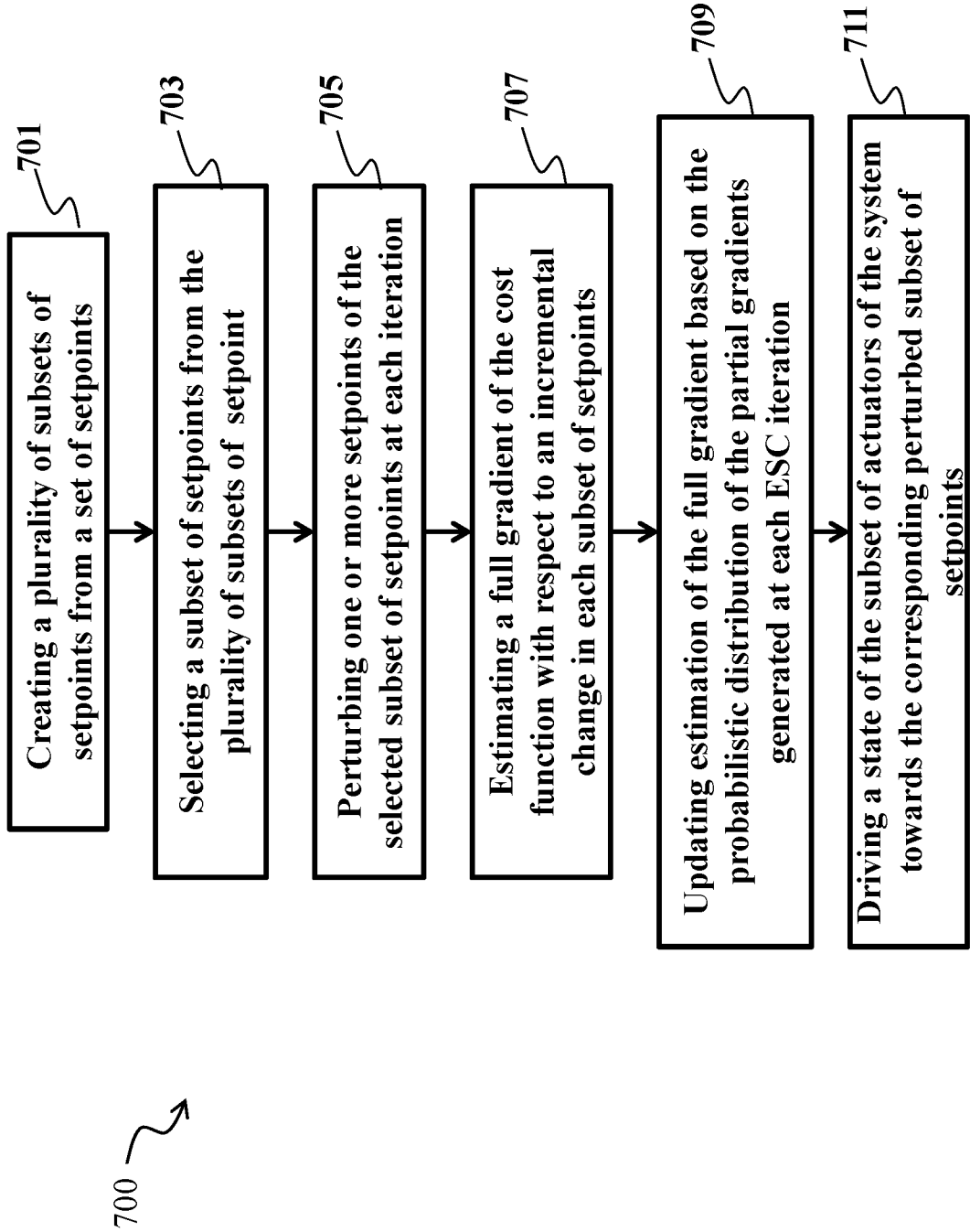
FIG. 7 illustrates steps of a method implemented for controlling a set of actuators of the system for minimizing energy consumption of the system, in accordance with an example embodiment.

FIG. 7 illustrates steps of a method 700 implemented for controlling a set of actuators of a system for minimizing energy consumption of the system, in accordance with an example embodiment. The set of actuators may be controlled using a corresponding set of setpoints. Further, a user may provide an optimal setpoint to operate the system with minimum energy consumption. The method 700 comprises steps to manipulate one or more setpoints in order to manipulate corresponding actuators such that the system is operated at the optimal setpoint with minimum energy consumption. The method 700 starts from step 701.

At step 701, a plurality of subsets of setpoints may be created from the set of setpoints. Each setpoint in the subset of setpoints can be manipulated to control the actuator in the corresponding set of actuators. The subset of setpoints may be created based on one or more constraints, where the one or more constraints comprises at least one of the physical constraints of the system such as maximum operable limit of the system, legal constraints, for example legally allowed speed of operation of the system, and business constraints such as minimization of overall energy consumption.

At step 703, a subset of setpoints from the plurality of subsets of setpoints may be selected. The subset of the setpoints may be selected either randomly or deterministically.

At step 705, one or more setpoints of the selected subset of setpoints may be perturbed at each iteration. In order to perturb one or more setpoints, a dither signal may be used at the one or more setpoints. In some embodiments, the dither signal corresponds to a sinusoidal signal. Further, the perturbation of the one or more setpoints of the selected subset of setpoints is based on a first-order moment and a second order moment of a probabilistic distribution of the partial gradients of the cost function, where the cost function provides a relation between values of the subset of setpoints to a cost of operation of the system.

At step 707, a full gradient of the cost function may be estimated with respect to an incremental change in each subset of setpoints. The estimated full gradient acts as a proxy for the actual full gradient that enables the control system to optimize the system by perturbing one or more setpoints in every iteration despite not having the actual full gradient. Further, the distribution of partial gradients is generated based on historical partial gradients associated with the previous subsets of setpoints.

At step 709, estimation of the full gradient may be updated based on the probabilistic distribution of the partial gradients generated at each ESC iteration. The estimated full gradient may be updated at every iteration till the actual full gradient is calculated.

At step 711, a state of the subset of actuators of the system may be driven towards the corresponding perturbed subset of setpoints. Further, the state of the system may be monitored and may be fed back to the control system 100 until the optimal state of the system is reached.

Figure 8:
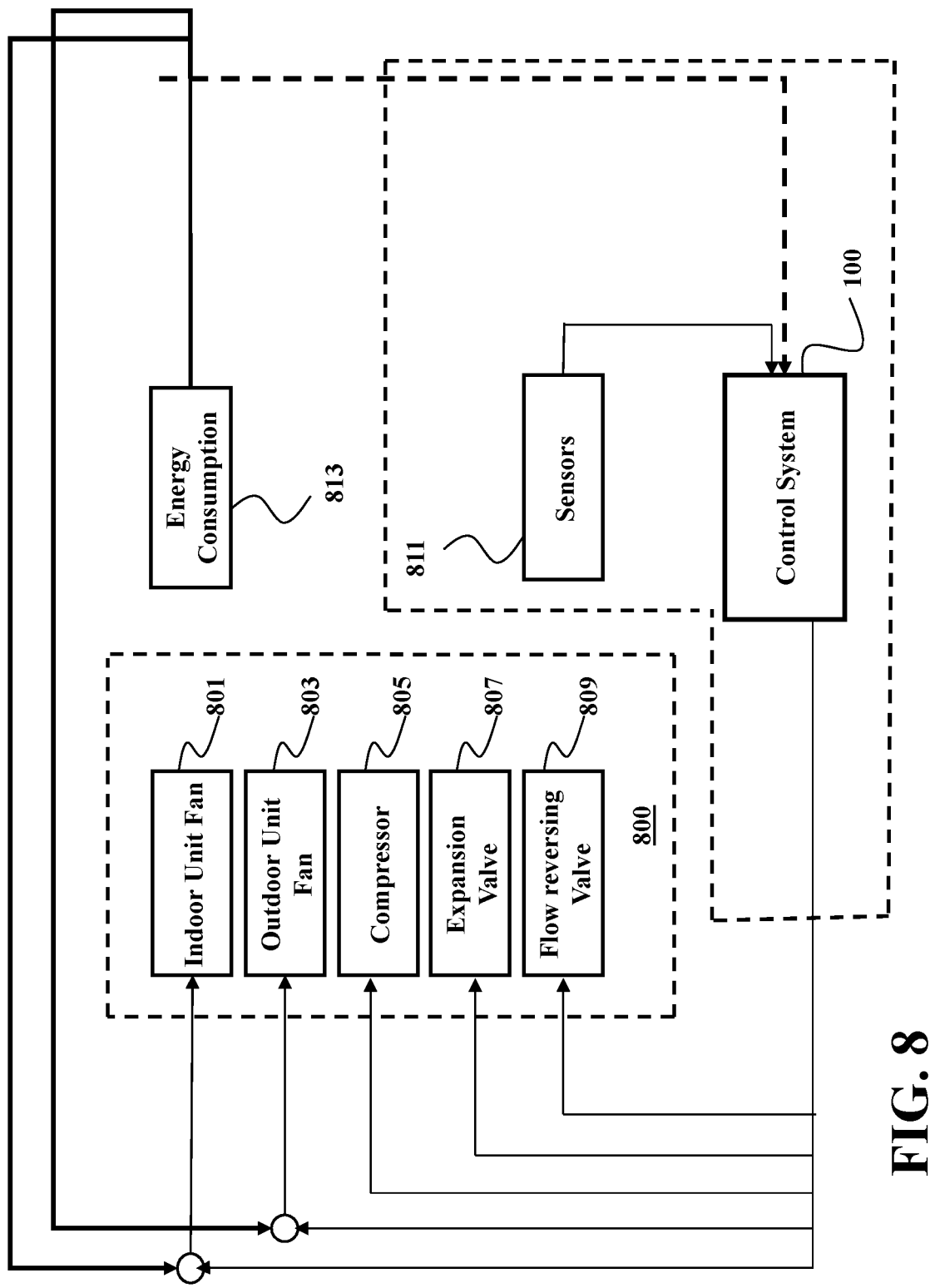
FIG. 8 illustrates a vapour compressor system implemented with the control system to minimize energy consumption of the vapour compressor system, in accordance with an example embodiment.

Exemplary Implementations:

FIG. 8 illustrates a vapour compressor system 800 implemented with the control system 100 to minimize energy consumption of the vapour compressor system 800, in accordance with an example embodiment. The vapour compressor system 800 comprises different actuators, for example, variable speed fans such as indoor unit fan 801 and outdoor unit fan 803, variable speed compressor 805, and electronically activated valves such as expansion valve 807 and flow reversing valve 809. Further, the vapour compressor system 800 comprises sensors 811 to monitor the state of vapour compressor system 800 and the state of each actuator of the vapour compressor system 800.

The control system 100 aims to minimize the energy usage of a vapour compression cycle, which is equivalent to minimizing the steady-state energy consumption 813 of the vapour compression cycle.

Further, different components of the vapour compressor system 800 are correlated to operate the vapour compressor system 800 with minimum energy consumption 813. However, a major challenge is to set these different and variable components to values for which the power is minimized.

The vapour compressor system 800 may be providing refrigeration to a building at a specific setpoint by operating its actuators at predetermined values. For example, vapour compressor system 800 operates the indoor unit fan 801 at 10 units, outdoor unit fan 803 at 6 units, compressor 805 at 5 units, expansion valve 807 at 3 units, and flow reversing valve 809 at 6 units. Further, state of each of these actuators is monitored by the sensors 811 and may be provided to the control system 100.

During the operation of the vapour compressor system 800, it is possible that a user may desire to operate the vapour compressor system 800 at a desired optimal setpoint inputted by the user. To that end, the user may further, set speed of indoor unit fan 801 at 5 units and operates other or remaining actuators of the vapour compressor system 800 at the predetermined values, then operating the vapour compressor system 800 at the desired setpoint with minimum energy consumption is a challenging task. To achieve that, the values at which the remaining actuators are operating are required to be optimized according to the fixed value of the speed of indoor unit fan 801, which is 5 units, such that minimum energy consumption is achieved.

To that end, the control system 100 uses the extremum seeking control with the stochastic gradient algorithm. The extremum seeking control with stochastic gradient algorithm is executed to manipulate or adjust operating points (or setpoints) of the remaining actuators (i.e. the actuators whose setpoints are not fixed such as the outdoor unit fan 803, compressor 805, expansion valve 807, and flow reversing valve 809) such that minimum energy consumption is achieved.

Based on the execution of the extremum seeking control with stochastic gradient algorithm, different combinations of setpoints are determined by the control system 100, where the best combination (i.e. global optimum) of operating points provides minimum energy consumption. To that end, the control system 100 operates in a closed-loop with the vapour compressor system 800 such that the current state of the vapour compressor system 800 corresponding to the current perturbed setpoints is feedback to the control system 100. Based on the current state of the vapour compressor system 800, the control system 100 determines whether the optimal state corresponding to the inputted setpoint is reached or not. In case, the current state of the vapour compressor system 800 does not correspond to the optimal state of the vapour compressor system 800, the control system 100 repeats iterations of the extremum seeking control with stochastic gradient algorithm until the optimal state is achieved.

For example, the best optimal combination of operating points to achieve minimum energy consumption with a value of the indoor unit fan 801 being fixed at 5 units may comprise adjusting the outdoor unit fan 803 to 8 units, compressor 805 to 6 units, expansion valve 807 to 2 units, and flow reversing valve 809 to 5 units. Thus, on the determination that at least one actuator can't be controlled, as its value is fixed by the user, the extremum seeking control with stochastic gradient algorithm is executed to manipulate operating points of the remaining actuators collectively in real-time such that the vapour compressor system 800 operates without interruption at the desired setpoint 821 with minimum energy consumption.

Figure 9:
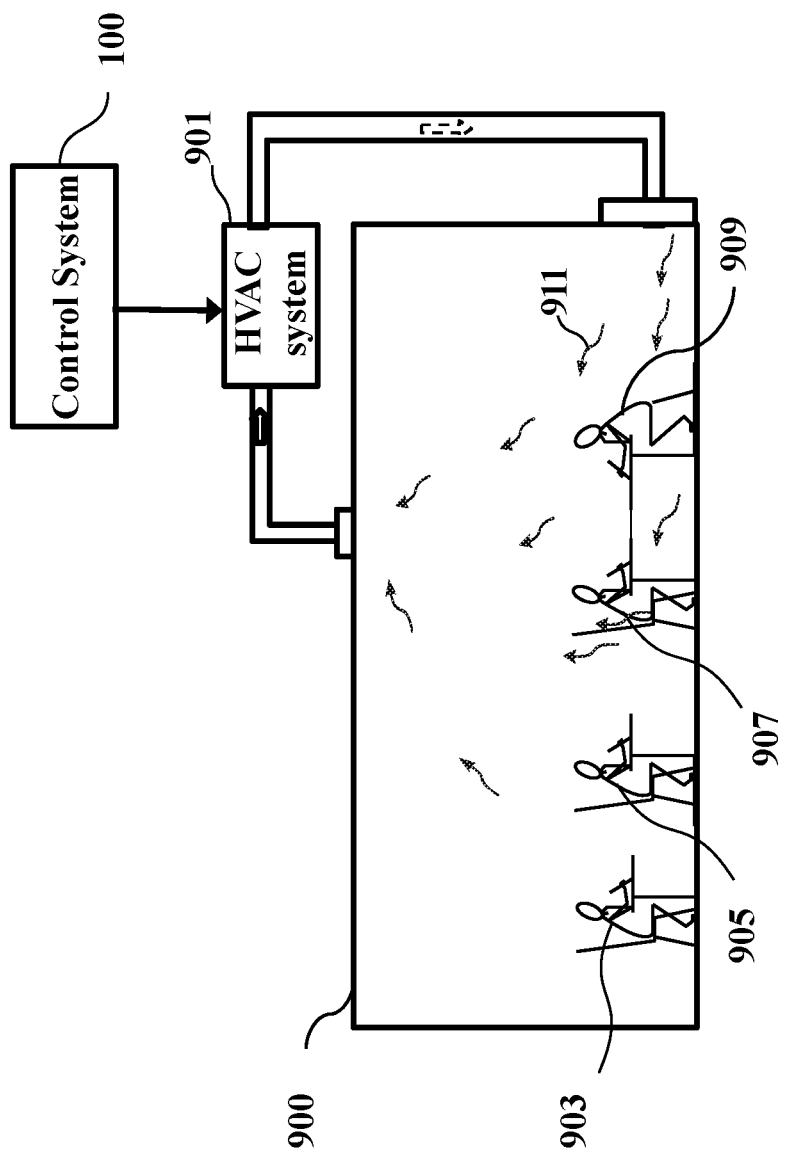
FIG. 9 illustrates controlling of heating, ventilating, and air-conditioning (HVAC system) using the control system, in accordance with an example embodiment.

FIG. 9 illustrates controlling of heating, ventilating, and air-conditioning (HVAC system) 901 using the control system 100, in accordance with an example embodiment. An "HVAC" system refers to any heating, ventilating, and air-conditioning (HVAC) system implementing the vapour compression cycle. The HVAC systems 901 span a very broad set of systems, ranging from systems, which supply only outdoor air to occupants of a building, to systems which only control the temperature of a building, or to systems, which control the temperature and humidity.

The HVAC system 901 is arranged to condition a room 900. The room 900 is occupied by occupants 903, 905, 907, and 909. Arrows 911 represent air supplied by the HVAC system 901 to condition the room 900. One of the occupants 903, 905, 907, and 909 may provide inputs (i.e. a specific set point and control inputs) to the HVAC system 901 to change the temperature of the room 900. Accordingly, one or more actuators of the HVAC system 901 may be controlled. Further, the state of each actuator may be determined while the HVAC system 901 is in operating mode. In case one or more actuators is determined to be non-controllable, an extremum seeking control with the stochastic gradient algorithm may be executed by the control system 100.

Based on the execution of the extremum seeking control with the stochastic gradient algorithm, the control system 100 manipulates a plurality of control inputs to minimizing power consumption of the HVAC system 901. The control inputs may include a position of an expansion valve of the HVAC system 901, a speed of a compressor HVAC system 901, a speed of an indoor fan of the HVAC system 901, a speed of an outdoor fan HVAC system 901, the like. Accordingly, the HAVC system 901 is operated with minimum energy consumption.

Exemplar Implementations

Figure 10:
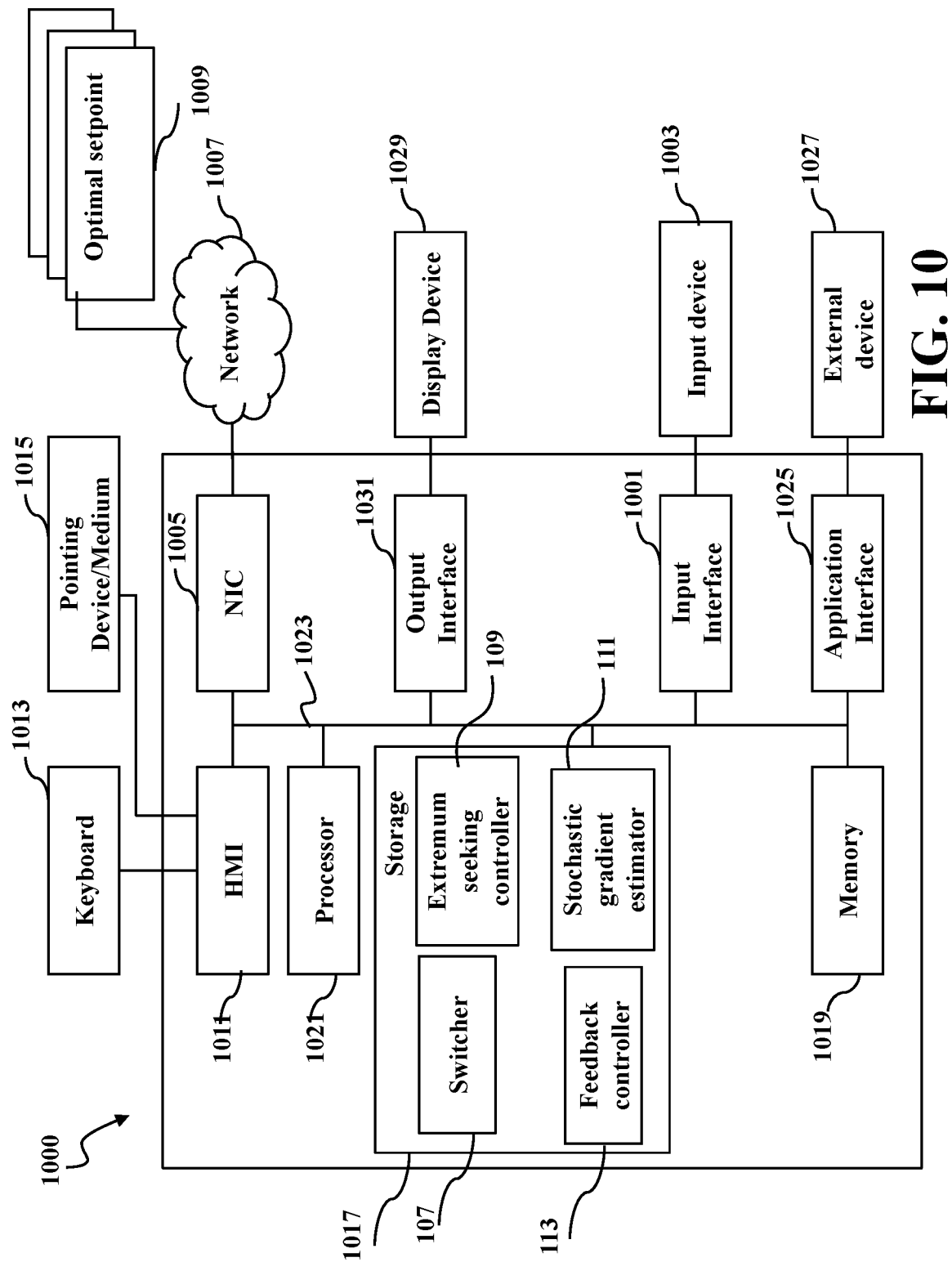
FIG. 10 illustrates a block diagram of a computer-based control system, in accordance with an example embodiment.

FIG. 10 illustrates a block diagram of a computer-based control system 1000, in accordance with an example embodiment. The computer-based control system 1000 may be used to control a controlled system (not shown in FIG.

10), where the controlled system comprises one of HVAC system, compressors, air conditioning system, an audio system, and the likes. The controlled system may also comprise a set of actuators to be controlled by the computer-based control system 1000 such that the controlled system operates at a desired optimal setpoint with minimum energy consumption.

The computer-based control system 1000 includes a number of interfaces connecting the control system 1000 with other systems and devices. The control system 1000 includes an input interface 1001 configured to accept an optimal setpoint 1009 at which the controlled system is desired to be operated with the minimum energy consumption. In some embodiments, the system 1000 includes an input interface configured to obtain the optimal setpoint 1009 (i.e. the stream of acoustic frames) from an input device 1003, where the input device may correspond to a remote control device to operate the controlled system.

In some embodiments, the input interface 1001 include a network interface controller (NIC) 1005 configured to obtain the optimal setpoint 1009, via network 1007, which can be one or combination of wired and wireless network.

The network interface controller (NIC) 1005 is adapted to connect the computer-based control system 1000 through a bus 1023 to the network 1007 connecting the computer-based control system 1000 with sensing devices, for example, input device 1003. Additionally or alternatively, the computer-based control system 1000 can include a human machine interface (HMI) 1011. The human machine interface 1011 within the computer-based control system 1000 connects the computer-based control system 1000 to a keyboard 1013 and pointing device 1015, wherein the pointing device 1015 can include a mouse, trackball, touchpad, joy stick, pointing stick, stylus, or touchscreen, among others.

The computer-based control system 1000 includes a processor 1021 configured to execute stored instructions 1017, as well as a memory 1019 that stores instructions that are executable by the processor 1021. The processor 1021 can be a single core processor, a multi-core processor, a computing cluster, or any number of other configurations. The memory 1019 can include random access memory (RAM), read only memory (ROM), flash memory, or any other suitable memory systems. The processor 1021 can be connected through the bus 1023 to one or more input and output devices.

The instructions 1017 can implement a method for controlling the set of actuators of the controlled system to minimize energy consumption of the controlled system, according to some embodiments. To that end, the computer memory 1019 stores the switcher 107, the extremum seeking controller (ESC) 109, the stochastic gradient estimator 111, and the feedback controller. The switcher 107 is configured to create a plurality of subsets of setpoints from a set of setpoints corresponding to the set of actuators. The subsets are created based on one or more constraints such as physical constraints of the controlled system, legal constraints on the controlled system, and the business constraints on the controlled system. Further, the switcher 107 is configured to select at least one subset of setpoints, from the plurality of subsets of setpoints. To that end, the switcher 107 is configured to select subset of actuators from a set of actuators, where the subset of actuators may be selected at least one of: randomly or semi-randomly or deterministically.

Further, the ESC 109 perturbs one or more setpoints of the selected subset of setpoints at each iteration of the ESC 109, where the ESC 109 uses extremum seeking control algorithm. In order to perturb one or more setpoints, the ESC 109 uses a dither signal at the one or more setpoints, where the dither signal corresponds to a sinusoidal signal. Further, the perturbation of the one or more setpoints of the selected subset of setpoints is based on a first-order moment and a second order moment of a probabilistic distribution of the partial gradients of the cost function generated by the stochastic gradient estimator 111.

The stochastic gradient estimator 111 determines a partial gradient associated with the selected subset of setpoints. The partial gradient corresponds to a gradient of the cost function with respect to the selected subset of setpoints, where one or more setpoints of the selected subset of setpoints are perturbed. Further, the stochastic gradient estimator 111 generates the probabilistic distribution of the partial gradients obtained at each ESC iteration associated with the selected (or current) subset of setpoints and the previously selected subset of setpoints. The stochastic gradient estimator 111 further, computes moments: first-order: mean, and second-order: variance of the probabilistic distribution of partial gradients and determines a statistical estimate of the full gradient. The stochastic gradient estimator 111 updates estimation of the full gradient based on the probabilistic distribution of the partial gradients generated at each ESC iteration.

Further, the feedback controller 113 drives the state of the controlled system based on the perturbed subset of setpoints at ESC iteration till a state of the controlled system corresponding to the optimal setpoint (i.e. optimal state) inputted by the user is reached. Thus, the feedback controller 113 keeps feeding back the current state of the controlled system to the ESC 109 to further perturb other subsets of setpoints till the controlled system is operated at the optimal state.

In an example embodiment, the computer-based control system 1000 may comprise an output interface 1031 configured to notify the user that the controlled system is being operated at the optimal state and the minimum energy is being consumed by the controlled system on a display device 1029. Examples of a display device 1029 include a computer monitor, television, projector, or mobile device, among others. The computer-based control system 1000 can also be connected to an application interface 1025 adapted to connect the computer-based control system 1000 to an external device 1027.

Embodiments

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments.

A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A control system for controlling a set of actuators of a system, the control system comprising:
at least one processor; and a memory having instructions stored thereon that form modules of the control system, wherein the at least one processor is configured to execute the instructions of the modules of the control system, the modules comprising:
a switcher configured to:
create a plurality of subsets of setpoints from a set of setpoints, wherein the set of setpoints controls the corresponding set of actuators; and
select a subset of setpoints from the plurality of subsets of setpoint, wherein the subset of setpoints controls the corresponding subset of actuators;
an extremum-seeking controller (ESC) configured to perturb one or more setpoints of the selected subset of setpoints at each iteration based on a first-order moment and a second-order moment of a probabilistic distribution of partial gradients, generated from a current ESC iteration and the previous ESC iterations, of a cost function relating values of the subset of setpoints to a cost of operation of the system;
a stochastic gradient estimator configured to:
estimate a full gradient of the cost function with respect to incremental changes in each subset of setpoints; and
update estimation of the full gradient based on the probabilistic distribution of the partial gradients generated at each ESC iteration; and
a feedback controller configured to drive a state of the subset of actuators of the system towards the corresponding perturbed subset of setpoints.

2. The control system of claim 1, wherein to determine the full gradient, the stochastic gradient estimator is further configured to calculate a gradient of the cost function with respect to each setpoint of the set of setpoints, and wherein the each setpoint of the set of setpoints is perturbed at least at some instances of time.

3. The control system of claim 1, wherein to determine the partial gradient, the stochastic gradient estimator is further configured to calculate a gradient of the cost function with respect to the selected subset of setpoints, and wherein one or more setpoints of the selected subset of setpoints are perturbed.

4. The control system of claim 1, wherein to perturb the one or more setpoints, the ESC is configured to use a dither signal at the one or more setpoints, and wherein the dither signal corresponds to a sinusoidal signal.

5. The control system of claim 1, wherein the ESC is further configured to:
determine whether to increase or decrease the one or more setpoints based on the first-order moment; and
determine a step size associated with the increase or decrease of the one or more setpoints based on a ratio of the first-order moment and a square root of the second-order moment.

6. The control system of claim 1, wherein the stochastic gradient estimator implements at least one of an adaptive momentum estimation (Adam) algorithm, an adaptive gradient (Adagrad) algorithm, and a root mean square propagation (RMSprop) algorithm.

7. The control system of claim 1, wherein the switcher is configured to create the subset of setpoints based on one or more constraints, and wherein the one or more constraints comprises at least one of physical constraints of the system, legal constraints, and business constraints.

8. The control system of claim 1, wherein the cost function is associated with energy consumption of the system, and wherein at least one processor is further configured to minimize the cost function.

9. The control system of claim 1, wherein, to select the subset of setpoints, the switcher is further configured to select a subset of actuators in at least one of: a random manner, a deterministic manner, and a semi-random manner.

10. The control system of claim 9, wherein each actuator of the set of actuators is weighted for the selection in the subset of actuators, and wherein a weight of each actuator is a function of energy consumption by the corresponding actuator.

11. A method of controlling a set of actuators of a system, the method comprising:
    creating a plurality of subsets of setpoints from a set of setpoints, wherein the set of setpoints controls the corresponding set of actuators;
    selecting a subset of setpoints from the plurality of subsets of setpoint, wherein the subset of setpoints controls the corresponding subset of actuators;
    perturbing one or more setpoints of the selected subset of setpoints at each iteration based on a first-order moment and a second-order moment of a probabilistic distribution of partial gradients, generated from a current ESC iteration and the previous ESC iterations, of a cost function relating values of the subset of setpoints to a cost of operation of the system;
    estimating a full gradient of the cost function with respect to an incremental change in each subset of setpoints;
    updating estimation of the full gradient based on the probabilistic distribution of the partial gradients generated at each ESC iteration; and
    driving a state of the subset of actuators of the system towards the corresponding perturbed subset of setpoints.

12. The method of claim 11, wherein for determining the full gradient, the method further comprises calculating a gradient of the cost function with respect to each setpoint of the set of setpoints, and wherein the each setpoint of the set of setpoints is perturbed.

13. The method of claim 11, wherein for determining the partial gradient, the method further comprises calculating a gradient of the cost function with respect to the selected subset of setpoints, and wherein one or more setpoints of the selected subset of setpoints are perturbed.

14. The method of claim 11, wherein for perturbing the one or more setpoints, the method further comprises using a dither signal at the one or more setpoints, and wherein the dither signal corresponds to a sinusoidal signal.

15. The method of claim 11, wherein for perturbing one or more setpoints of the selected subset of setpoints at each iteration, the method further comprising:
    determining whether to increase or decrease the one or more setpoints based on the first-order moment; and
    determining a step size associated with the increase or decrease of the one or more setpoints based on a ratio of the first-order moment and a square root of the second-order moment.

16. The method of claim 11, wherein the method further comprises executing at least one of an adaptive momentum estimation (Adam) algorithm, an adaptive gradient (Adagrad) algorithm, and a root mean square propagation (RMSprop) algorithm.

17. The method of claim 11 wherein the subset of setpoints is created based on one or more constraints, and wherein the one or more constraints comprises at least one of physical constraints of the system, legal constraints, and business constraints.

18. The method of claim 11, wherein the cost function is associated with energy consumption of the system.

* * * * *